US007869104B2

(12) United States Patent
Murakami

(10) Patent No.: US 7,869,104 B2
(45) Date of Patent: Jan. 11, 2011

(54) MEDIUM FEEDING APPARATUS AND IMAGE FORMING APPARATUS

(75) Inventor: Tatsuya Murakami, Tokyo (JP)

(73) Assignee: Oki Data Corporation, Tokyo (JP)

( * ) Notice: Subject to any disclaimer, the term of this patent is extended or adjusted under 35 U.S.C. 154(b) by 977 days.

(21) Appl. No.: 11/684,171

(22) Filed: Mar. 9, 2007

(65) Prior Publication Data

US 2007/0222136 A1 Sep. 27, 2007

(30) Foreign Application Priority Data

Mar. 22, 2006 (JP) ............................ 2006-078894

(51) Int. Cl.
*H04N 1/04* (2006.01)

(52) U.S. Cl. ...................................... 358/498; 271/274

(58) Field of Classification Search ................. 358/498; 271/274

See application file for complete search history.

(56) References Cited

U.S. PATENT DOCUMENTS

2004/0164485 A1 * 8/2004 Yoneda et al. .............. 271/274
2007/0003346 A1 * 1/2007 Higaki et al. ............... 399/408

FOREIGN PATENT DOCUMENTS

JP 2004-137078 5/2004

* cited by examiner

*Primary Examiner*—Twyler L Haskins
*Assistant Examiner*—Michael Burleson
(74) *Attorney, Agent, or Firm*—Rabin & Berdo, PC

(57) ABSTRACT

A medium feeding apparatus includes a main body, and a medium placing unit at least a part of which can be housed in the main body. The medium placing unit includes a first placing unit held by the main body in such a manner that the first placing unit is shiftable between a housed position where at least one of the first placing unit is housed in the main body and a placing position where the medium can be placed on the first placing unit, a second placing unit has a first shifting condition where the medium can be placed on the first and second placing units and a second shifting condition where the second placing unit is overlapped with the first placing unit, and an auxiliary member disposed on a boundary between the first placing unit and the second placing unit when the second placing unit is in the first shifting condition.

14 Claims, 16 Drawing Sheets

602
602c
606
607
609
A
B

MEDIUM FEEDING APPARATUS AND IMAGE FORMING APPARATUS

BACKGROUND OF THE INVENTION

This invention relates to a medium feeding apparatus having a medium placing portion, and relates to an image forming apparatus having the medium feeding apparatus and forming an image on a recording medium.

In a conventional sheet supply tray or sheet ejection tray, an openable main tray is provided on a side, front or rear surface of a main body of an image forming apparatus, and a plurality of slidable or foldable auxiliary trays are provided on the main tray. The main tray is configured to have a length corresponding to a regular sized recording medium of a standard length. The auxiliary tray is configured to have a standard length when the auxiliary tray is drawn from the main tray.

Recently, in accordance with the downsizing of the medium feeding apparatus, the shape of the tray tends to be determined to avoid interference with a protrusion such as an operation panel and a locking member for a cover. Therefore, when the folded auxiliary tray is opened, an opening may be formed on an engaging portion between the main tray and the auxiliary tray, or a step or a gap may be formed on a connecting portion between the main tray and the auxiliary tray. In such a case, during the setting of the recording sheets on the tray, the recording sheet may be caught in the opening, step or gap, so that the bending, buckling or breakage of the recording sheet may occur. In order to avoid this problem, it is necessary to set the recording sheets with the greatest care, and therefore the handling of the recording sheets is not easy.

SUMMARY OF THE INVENTION

An object of the present invention is to provide a medium feeding apparatus and an image forming apparatus enabling a constantly stable setting of a medium and enhancing the ease of handling of the medium.

The present invention provides a medium feeding apparatus including a main body, and a medium placing unit at least a part of which can be housed in the main body. The medium placing unit includes a first placing unit held by the main body in such a manner that the first placing unit is shiftable between a housed position where at least a part of the first placing unit is housed in the main body and a placing position where a medium can be placed on the first placing unit, a second placing unit having a first shifting condition where the medium can be placed on the first and second placing units and a second shifting condition where the second placing unit is overlapped with the first placing unit, and an auxiliary member disposed on a boundary between the first placing unit and the second placing unit when the second placing unit is in the first shifting condition.

The present invention also provides an image forming apparatus including the above described medium feeding apparatus.

With such an arrangement, the auxiliary member is disposed on the boundary between the first placing unit and the second placing unit, and therefore it becomes possible to prevent the breakage of the medium at the boundary.

DETAILED DESCRIPTION OF THE PREFERRED EMBODIMENT

Embodiments of the present invention will be described with reference to the attached drawings.

Embodiment 1

Figure 1:
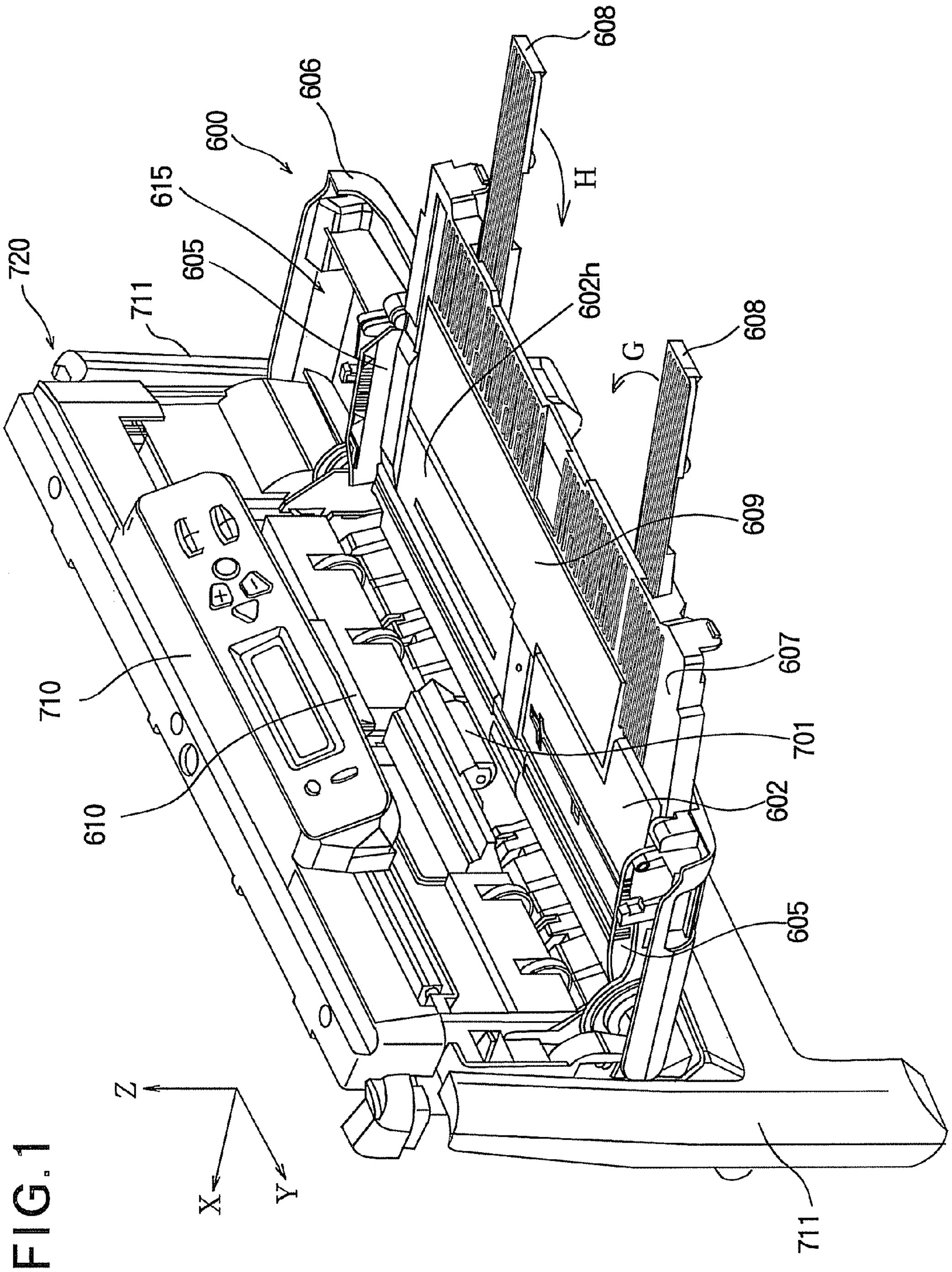
FIG. 1 is a perspective view showing an external shape of a medium feeding apparatus according to Embodiment 1 of the present invention.
Figure 2:
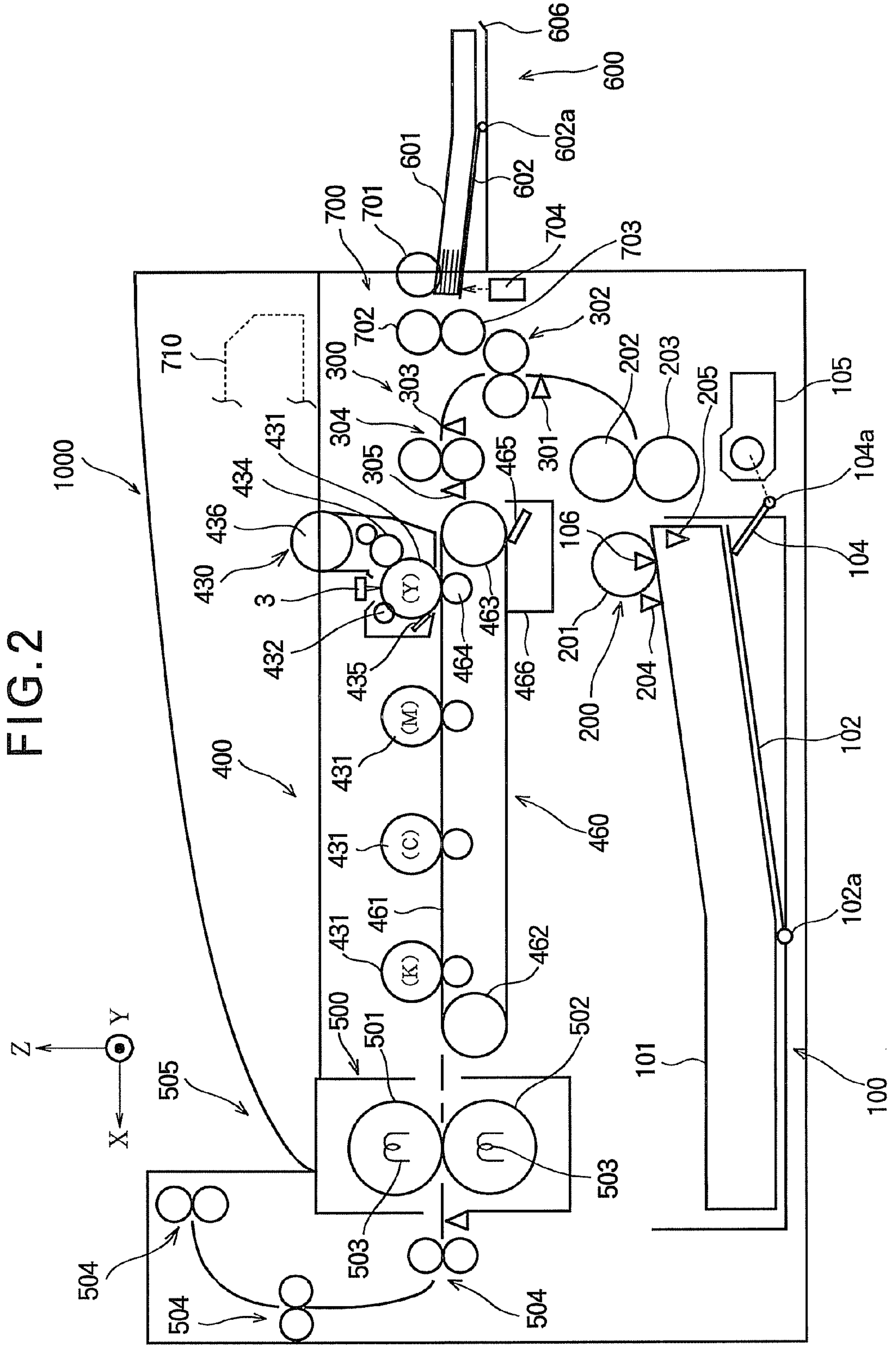
FIG. 2 is a schematic view showing a main part of an image forming apparatus using the medium feeding apparatus according to Embodiment 1 of the present invention.

FIG. 1 is a perspective view showing an outer shape of a medium feeding apparatus according to Embodiment 1 of the present invention. FIG. 2 is a schematic view showing a main part of an image forming apparatus using the medium feeding apparatus according to Embodiment 1 of the present invention.

First, the image forming apparatus shown in FIG. 2 will be described.

The image forming apparatus 1000 shown in FIG. 2 has a configuration of, for example, an electrophotographic color printer. In FIG. 2, a sheet supply tray 100 is detachably attached to the image forming apparatus 1000. The sheet supply tray 100 stores recording sheets (i.e., media) 101 stacked therein. In the sheet supply tray 100, a sheet placing plate 102 is rotatably supported by a supporting shaft 102*a*. A half or more of the stack of the recording sheets 101 on a sheet delivery side is placed on the sheet placing plate 102. A not shown guide member is provided in the sheet supply tray 100, which defines a stacking position of the recording sheets 101. The guide member defines sides of the recording sheets 101 in the sheet delivery direction of the recording sheets 101 (i.e., the negative direction of the X-axis) and in the direction perpendicular to the sheet delivery direction, so as to keep the stacking position of the recording sheets 101 constant.

On the sheet delivery side (i.e., the right side in FIG. 2) of the sheet supply tray 100, a lift-up lever 104 is rotatably supported by a supporting shaft 104*a*. The supporting shaft 104*a* is disconnectably connected to a motor 105. When the sheet supply tray 100 is attached to the image forming apparatus 1000, the lift-up lever 104 is linked to the motor 105, and a not shown controller drives the motor 105. By the rotation of the lift-up lever 104, the end of the lift-up lever 104 pushes the bottom of the sheet placing plate 102 upward, so that the recording sheets 101 stacked on the sheet stacking plate 102 move upward. When the recording sheets 101 reach a predetermined height, an upward movement detector 106 detects that the recording sheets 101 reach the predetermined height. Based on the detection signal from the upward movement detector 106, the controller (not shown) stops the motor 105.

A sheet delivery portion 200 is provided on the delivery side of the sheet supply tray 100, and delivers the recording sheets 101 one by one. The sheet delivery portion 200 includes a pickup roller 201 pushed against the uppermost recording sheet 101 (moved upward to a certain height), and a feed roller 202 and a retard roller 203 that separate the recording sheets 101 (from each other) picked up by the pickup roller 201. The sheet delivery portion 200 further includes a sheet presence detecting portion 204 that detects the presence and absence of the recording sheets 101, and a sheet remaining amount detecting portion 205 that detects the remaining amount of the recording sheets 101.

The recording sheet 101 individually delivered by the sheet delivery portion 200 reaches a sheet transport portion 300. The recording sheet 101 passes a sheet sensor 301 and reaches a pair of transport rollers 302. The pair of transport rollers 302 start rotating (by a not shown driving portion) at a predetermined delay after the recording sheet 101 passes the sheet sensor 301. Therefore, the recording sheet 101 is pushed into the nip portion between the transport rollers 302 so that the recording sheet 101 is slightly bent, and the skew of the recording sheet 101 is corrected. The recording sheet 101 transported by the transport rollers 302 passes through a sheet sensor 303, and reaches another pair of transport rollers 304. The pair of transport rollers 304 start rotating (by a not shown driving portion) when the recording sheet 101 passes the sheet sensor 303, and transport the recording sheet 101 without stopping the movement of the recording sheet 101. The recording sheet 101 transported by the transport rollers 304 passes a writing sensor 305 and reaches an image forming portion 400.

The image forming portion 400 includes four toner image forming portions 430 arranged linearly and transferring portions 460. The transferring portions 460 transfer toner images formed by the toner image forming portions 430 to the upper surface of the recording sheet 101 by means of Coulomb force. The linearly aligned four toner image forming portions 430 have the same configuration except the colors of the toners. That is, the toner image forming portions 430 respectively use toners of colors of yellow (Y), magenta (M), cyan (c) and black (B). For ease of explanation, structures of respective parts of the toner image forming portion 430 of yellow (Y) will be described. The explanation of the other toner image forming portions 430 will be omitted, and only photosensitive drums 431 thereof are shown in drawings.

The toner image forming portion 430 includes a photosensitive drum 431 that bears the toner image, a charging roller 432 that charges the surface of the photosensitive drum 431, an LED head 433 composed of LED array that forms a latent image on the charged surface of the photosensitive drum 431, a developing roller 434 that develops the latent image by means of friction electrification to form the toner image, a toner supply portion 436 that supplies the toner, and a cleaning blade 435 that scrapes off the residual toner remaining on the surface of the photosensitive drum 431 after the transferring of the toner image.

The transfer portion 460 includes a transfer belt 461 that absorbs the recording sheet 101 by means of static electricity and transports the recording sheet 101, a drive roller 462 rotated by a not shown driving portion to drive the transfer belt 461, a tension roller 463 that constitutes a pair with the drive roller 462 to stretch the transfer belt 461, a transfer roller 464 that applies voltage for transferring the toner image to the recording sheet 101, a cleaning blade 465 that scrapes off the residual toner remaining on the surface of the transfer belt 461, and a toner box 466 in which the toner scraped off by the cleaning blade 465 is accumulated.

The toner image forming portions 430 and the transfer belts 461 are driven in synchronization with each other, and transfer the toner images of the respective colors to the recording medium 101 absorbed by the transfer belt 461 using static electricity. With such a process, the recording sheet 101 with the toner image (formed by the image forming portion 400) is transported to a fixing unit 500 that fixes the toner image to the recording sheet 101 using heat and pressure.

The fixing unit 500 includes a pair of rollers, i.e., an upper roller 501 and a lower roller 502 each of which includes a halogen lamp 503 as an internal heat source and a surface layer made of a resilient body. The fixing unit 500 applies heat and pressure to the toner image on the recording sheet 101 so that the toner image is molten and fixed to the recording sheet 101. Then, the recording sheet 101 is ejected by a pair of ejection rollers 504 to a stacker portion 505.

The image forming apparatus 1000 includes a sheet supply tray 600 as a second sheet supply unit, which has the same function as the sheet supply tray 100. The sheet supply tray 600, which is generally called as an MPT (Multi Purpose Tray) or a manual insertion tray, is used in various ways and corresponds to a thin sheet, a thick sheet, a narrow sheet, a lengthy sheet, a special medium or the like. Particularly, in the case where the recording sheet is supplied from the sheet supply tray 100, a load applied to the recording sheet may increase because of a curved transport path in the sheet transport portion 300. Therefore, a straight path structure (enabled by using the sheet supply tray 600) is used for a thick sheet having a rigidity and a lengthy sheet whose length is too long to be stored in the sheet supply tray 100.

The sheet supply tray 600 is rotatably mounted to the main body of the image forming apparatus 1000 as described later. When the sheet supply tray 600 is in use, the sheet supply tray 600 is opened so that the recording sheets 601 are stacked on the sheet supply tray 600. When the sheet supply tray 600 is opened, a pickup roller 701 is drawn from the inside of the image forming apparatus 1000 by means of a not shown hopper mechanism described later. The sheet supply tray 600 includes a sheet placing plate 602 rotatably supported by rotation supporting portions 651*a* and 651*b*, and the recording sheets 601 are stacked on the sheet placing plate 602.

Further, a guide member (not shown) is provided in the sheet supply tray 600, which defines the stacking position of the recording sheets 601. The guide member defines sides of the recording sheets 601 in the sheet delivery direction (i.e., the positive direction of the X-axis) and the direction perpendicular to the sheet delivery direction, so as to keep the stacking position of the recording sheets 601 constant. Furthermore, the sheet supply tray 600 includes a first auxiliary tray 607 and a second auxiliary tray 608 (FIG. 1) for stacking the recording sheets 601 elongated in the sheet delivery direction as described later.

On the sheet delivery side of the sheet supply tray 600, a lift-up mechanism 704 engaging the sheet placing plate 602 (rotatably provided on the rotation supporting portions 651*a* and 651*b*) to thereby control the position of the recording sheets 601 on the sheet placing portion 602. The lift-up mechanism 704 defined the height of the end (tip) of the sheet placing plate 602.

A sheet delivery portion 700 is provided at the sheet delivery side of the sheet supply tray 600. The sheet delivery portion 700 delivers the recording sheets 601 one by one. The sheet delivery portion 700 has the same function as the above described sheet delivery portion 200. The sheet delivery portion 700 includes the pickup roller 701 pushed against the uppermost recording sheet 601 (moved upward to a certain height) and a feed roller 702 and a retard roller 703 that separate the recording sheets 601 (from each other) picked up by the pickup roller 701. The sheet delivery portion 700 further includes a sheet presence detecting portion (not shown) that detects the presence and absence of the recording sheets 601 and a sheet remaining amount detecting portion (not shown) that detects the remaining amount of the recording sheets 601. The sheet presence detecting portion and the sheet remaining amount detecting portion are the same as those of the sheet presence detecting portion 204 and the sheet remaining amount detecting portion 205 of the sheet delivery portion 200.

The recording sheet 601 individually delivered by the sheet delivery portion 700 reaches the sheet transport portion 300, and is transported in a similar manner to the recording sheet 101 delivered by the above described sheet supply tray 100.

The X-axis, Y-axis and Z-axis (i.e., YYZ-coordinate) shown in FIGS. 1 and 2 are defined as described below. The X-axis is defined in the direction in which the recording sheet 101 (601) is transported through the respective toner image forming portions 430. The Y-axis is defined in the direction of the rotation axes of the photosensitive drums 431. The Z-axis is defined to be perpendicular to the X-axis and the Y-axis. In other drawings, the X-axis, Y-axis and Z-axis indicate the same directions as those shown in FIGS. 1 and 2. In other words, the X-axis, Y-axis and Z-axis indicate the directions of the respective parts (shown in the respective drawings) when the respective parts constitute the image forming apparatus 1000 shown in FIG. 2.

FIG. 1 is a perspective view showing a main part of a medium feeding apparatus according to Embodiment 1 of the present invention. As shown in FIG. 1, the medium feeding apparatus 720 includes the sheet supply tray 600 (i.e., a medium placing unit), a supporting portion 711, a locking portion 610, the pickup roller 701 (respectively shown in FIG. 1), the feed roller 702, the retard roller 703, the lift-up mechanism 704 (respectively shown in FIG. 2) and the like. A main body of the medium feeding apparatus 720 is defined as a part including the supporting portion 711.

The sheet supply tray 600 as a medium placing unit includes an outer cover portion 606 (i.e., a holding member) rotatably held by the supporting portion 711 of the main body of the medium feeding apparatus 720 as described later. The sheet supply tray 600 further includes a sheet placing plate (i.e., a medium placing portion, a main tray) 602 rotatably supported by the outer cover portion 606, on which the recording sheets 601 are stacked. The sheet supply tray 600 further includes a pair of (left and right) side guide members 605 formed on the sheet placing plate 602 for defining both sides of the recording sheets 601 (FIG. 2). The sheet supply tray 600 further includes a first auxiliary tray (i.e., a second placing unit) 607 rotatably supported by the outer cover portion 606 for stacking the recording sheets whose size is long in the sheet feeding direction. The sheet supply tray 600 further includes a pair of second auxiliary trays 608 rotatably supported by the first auxiliary tray 607. The sheet supply tray 600 further includes an auxiliary placing plate (i.e., an auxiliary member) 609 rotatably supported by the first auxiliary tray 607, which covers a boundary between the sheet placing plate 602 and the first auxiliary tray 607. The above described outer cover 606 and the sheet placing plate 602 constitute a main placing portion 615 (i.e., a first placing unit) of the sheet supply tray 600. The recording sheets 601 are placed on a placing surface 602*h* of the sheet placing plate 602.

When the pair of second auxiliary trays 608 are not in use, the second auxiliary trays 608 are rotated as shown by arrows G and H in FIG. 1, and are housed in the lower part of the first auxiliary tray 607.

Figures 3A, 3B, 3C, 3D, 3E, 3F, 3G:
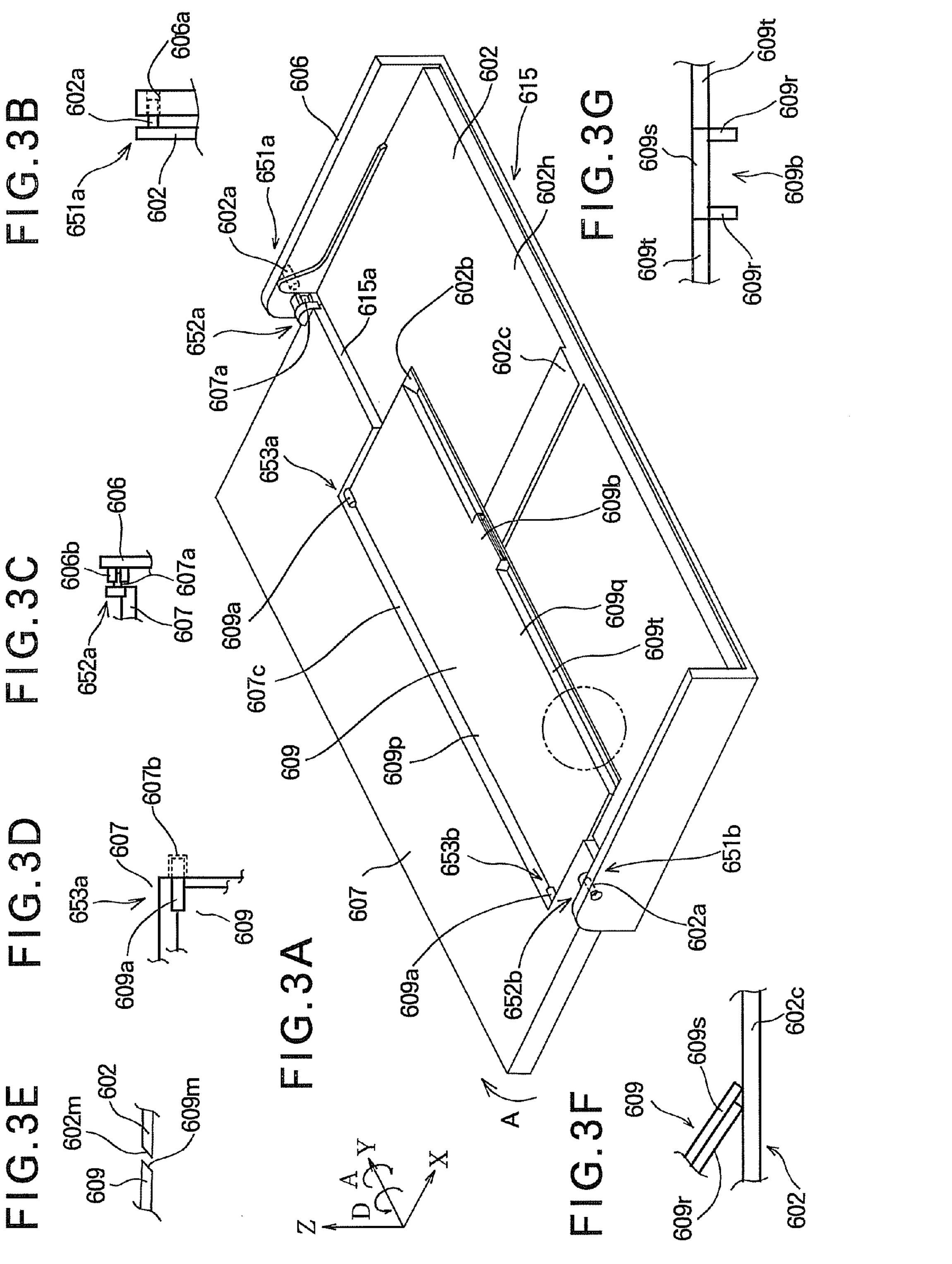
FIG. 3A is a simplified view showing a relationship among an outer cover portion, a sheet placing plate, a first auxiliary tray and an auxiliary placing plate (when assembled) according to Embodiment 1 of the present invention.
FIGS. 3B through 3G show structures for mounting respective parts.

FIG. 3A is a simplified view showing a relationship among the outer cover portion 606, the sheet placing plate (the main tray) 602, the first auxiliary tray 607 and the auxiliary placing plate 609 when assembled. FIGS. 3B through 3G show structures for mounting respective parts.

The sheet placing portion 602 has a pair of bosses 602*a* formed on both ends in the vicinity of the longer side thereof on the side facing the first auxiliary tray 607. The bosses 602*a* are coaxial with each other, and form a rotation shaft portion. FIG. 3B is a partial view showing a structure of a rotation supporting portion 651*a* which is one of rotation supporting portions 651*a* and 651*b* including the bosses 602*a*, as seen from the positive side in the direction of the X-axis. As shown in FIG. 3B, the boss 602*a* engages (and is rotatably supported by) one of shaft receiving portions 606*a* formed on both ends of the outer cover portion 606. The other rotation supporting portion 651*b* is configured in a similar manner to the rotation supporting portion 651*a*. With such a configuration, the sheet placing plate 602 is rotatably supported by the outer cover portion 606.

The sheet placing plate 602 has a rectangular U-shaped cutout portion 602*b* having predetermined width and depth formed on a side facing the first auxiliary tray 607. The position shown in FIG. 3B where the sheet placing plate 602 contacts and is stably held by the outer cover portion 606 is referred to as a reference rotational position of the sheet placing plate 602.

The first auxiliary tray 607 has a pair of bosses 607*a* formed on both ends in the vicinity of the longer side thereof on the side facing the sheet placing plate 602. The bosses 607*a* are coaxial with each other, and form a rotation shaft portion. FIG. 3C is a partial view showing a structure of a rotation supporting portion 652*a* which is one of the rotation supporting portions 652*a* and 652*b* including the bosses 607*a*, as seen from the positive side in the direction of the X-axis. As shown in FIG. 3C, the boss 607*a* engages (and is rotatably supported by) one of shaft receiving portions 606*b* formed on both ends of the outer cover portion 606. The other rotation supporting portion 652*b* is configured in a similar manner to the rotation supporting portion 652*a*. With such a configuration, the first auxiliary tray 607 is rotatably supported by the outer cover portion 606 at a position adjacent to the sheet placing plate 602.

The first auxiliary tray 607 has a rectangular U-shape cutout portion 607*c* having a predetermined depth formed on the side facing the sheet placing plate 602. The cutout portion 607*c* of the first auxiliary tray 607 substantially face the cutout portion 602*b* of the auxiliary placing plate 602. A regulating unit (not shown) is provided to prevent the rotation of the first auxiliary tray 607 in a direction shown by the arrow D about the Y-axis due to the gravity or the like from the state shown in FIG. 3A where the first auxiliary tray 607 is substantially parallel to the sheet placing plate 602 in the reference rotational position. The condition of the first auxiliary tray 607 in this state is referred to as a fully-opening condition. When the first auxiliary tray 607 is in the fully-opening condition, the sheet placing plate 602 and the first auxiliary tray 607 substantially form a plane via a boundary (indicated by numeral 615*a* in FIG. 3A).

The auxiliary placing plate 609 has an outer shape so that the auxiliary placing plate 609 fits in a rectangular opening formed of the rectangular U-shaped cutout portion 602*b* of the sheet placing plate 602 and the rectangular U-shaped cutout portion 607*c* of the first auxiliary tray 607, with a slight gap formed between the auxiliary placing plate 609 and the rectangular opening. The auxiliary placing plate 609 has a pair of bosses 609*a* formed on both ends in the vicinity of the longer side thereof on the side (i.e., an end side) 609*p* facing the first auxiliary tray 607. The bosses 609*a* are coaxial with each other, and form a rotation shaft portion. FIG. 3D is a partial view showing a structure of a rotation supporting portion 653*a* which is one of rotation supporting portions 653*a* and 653*b* including the bosses 609*a*, as seen from the positive side in the direction of the Z-axis. As shown in FIG. 3D, the boss 609*a* engages (and is rotatably supported by) a shaft receiving portion 607*b* formed on a corresponding position of the first auxiliary tray 607. The other rotation supporting portion 653*b* is configured in a similar manner to the rotation supporting portion 653*a*. With such a configuration, the auxiliary placing plate 609 is rotatably supported by the first auxiliary tray 607.

The auxiliary placing plate 609 is prevented from rotating in a direction shown by the arrow A about the Y-axis due to the gravity or the like from the state shown in FIG. 3A where the auxiliary placing plate 609 is substantially parallel to the sheet placing plate 602 in the reference rotational position. For example, a part of the auxiliary placing plate 609 contacts the sheet placing plate 602, or a not shown regulating unit is used for preventing the auxiliary placing plate 609 from rotating in the direction A from the state shown in FIG. 3A. The condition of the auxiliary placing plate 609 in this state is referred to as a fully-opening condition.

As described above, the auxiliary placing plate 609 is disposed across the boundary between the sheet placing plate 602 and the first auxiliary tray 607, and prevents the formation of a linear gap extending throughout the boundary. Therefore, when the recording sheets 601 (FIG. 2) are stacked on the sheet placing plate 602 and the first auxiliary tray 607, the recording sheets 601 can be prevented from being caught in the gap (groove) at the boundary and from being bend, and other accidental situation can be avoided.

Further, as shown in FIG. 3A, a convex portion 602*c* is formed on the sheet placing plate 602 and extends in the sheet feeding direction as described later. The convex portion 602*c* acts as a guide when the auxiliary placing plate 609 is rotated. The auxiliary placing plate 609 has a to-be-guided portion 609*b* formed on the side 609*q* (i.e., the other end side) facing the sheet placing plate 602. The to-be-guided portion 609*b* is disposed on an end surface 609*t* of the auxiliary placing plate 609 and on a position corresponding to the convex portion 602*c*. When the auxiliary placing plate 609 is rotated, the to-be-guided portion 609*b* is guided by the convex portion 602*c* and moves in the sheet feeding direction. In FIG. 3A, the convex portion 602*c* and the to-be-guided portion 609*b* are disposed substantially at the center in the widthwise direction of the sheet placing plate 602. However, it is also possible to form the convex portion 602*c* and the to-be-guided portion 609*b* on both ends in the widthwise direction or other portions. As shown in FIG. 3E, the sheet placing plate 602 and the auxiliary placing plate 609 have slopes 602*m* and 609*m* where the sheet placing plate 602 and the auxiliary placing plate 609 face each other, so that the auxiliary placing plate 609 smoothly moves on the sheet placing plate 602.

The to-be-guided portion 609*b* includes a convex portion 609*s* having a surface parallel to the XY-plane and a pair of ribs 609*r* formed on both sides of the convex portion 609*s* in the direction of the Y-axis. The ribs 609*r* extend in the negative direction of the Z-axis from the convex portion 609*s* and have surfaces parallel to the XZ-plane.

FIG. 3F shows a state after the to-be-guided portion 609*b* and the convex portion 602*c* contact each other, as seen from the negative side in the direction of the Y-axis FIG. 3G shows the to-be-guided portion 609*b* as seen from the positive side in the direction of the X-axis when the auxiliary placing plate 609 is in the position shown in FIG. 3A.

When the auxiliary placing plate 609 is in the position shown in FIG. 3A, the end of the convex portion 609*s* is on the positive side with respect to the tips of the ribs 609*r* in the direction of the X-axis. Therefore, after the to-be-guided portion 609*b* and the convex portion 602*c* contact each other, the to-be-guided portion 609*b* is inclined with respect to the convex portion 602*c* as shown in FIG. 3F so that the auxiliary placing plate 609 smoothly moves on the sheet placing plate 602.

As shown in FIG. 1, an operation panel 710 is provided above the sheet supply tray 600 for operating the image forming apparatus 1000 (FIG. 2) or for checking the condition of the image forming apparatus 1000 (FIG. 2). The locking portion 610 is provided on the lower side of the operation panel 710, and holds the sheet supply tray 600 in a state where the sheet supply tray 600 is closed to the main body side. When the sheet supply tray 600 is not in use, the sheet supply tray 600 is closed and is locked by the locking portion 610. For example, when the recording sheet 601 (individually delivered by the sheet delivery portion 200) is jammed at the image forming portion 300, it is easy for the user to remove the jammed recording sheet 601 by opening the sheet supply tray 600 (the second sheet supply unit) to open the sheet feeding path.

Figure 4:
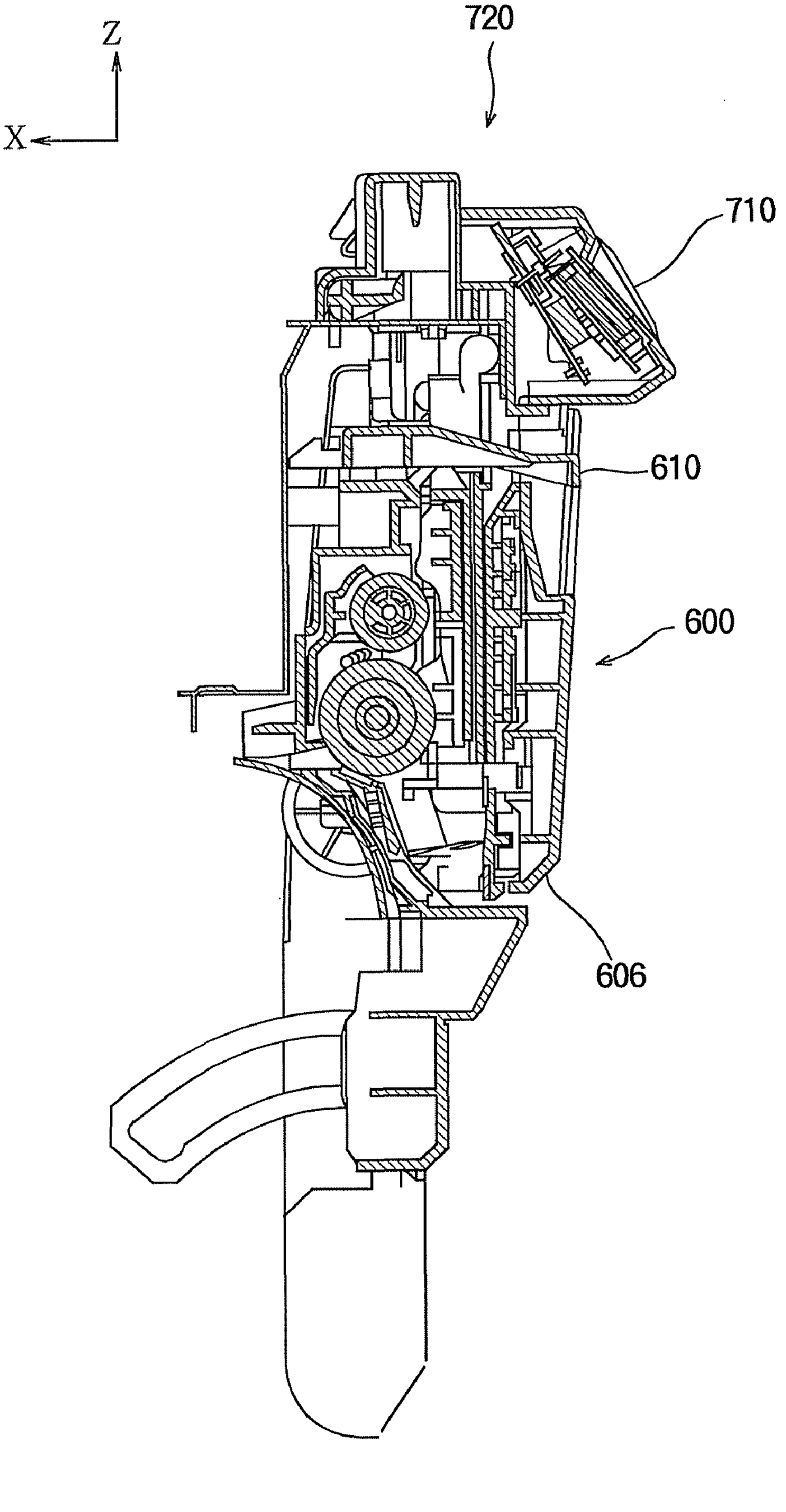
FIG. 4 is a sectional view showing a sheet supply tray in a housed position in which the sheet supply tray is folded to a main body side of the medium feeding apparatus and is locked by a locking portion.

FIG. 4 is a sectional view of the medium feeding apparatus 720 in a state where the sheet supply tray 600 is in a housed position, i.e., in a state where the sheet supply tray 600 is folded to the main body (of the medium feeding apparatus 720) side and locked by the locking portion 610. In this embodiment, as shown in FIG. 4, when the sheet supply tray 600 is folded and locked, the sheet supply tray 600 is disposed on the lower side of the operation panel 710 and the lock portion 610, and is housed in a compact space, so that the size of the image forming apparatus 1000 is reduced. Thus, the outer cover portion 606 is rotatable between a housed position shown in FIG. 4 and an operating position in which the recording sheets 101 can be stacked on the sheet supply tray 600 as shown in FIG. 1.

Figures 5A, 5B, 5C, 5D, 5E, 5F, 5G:
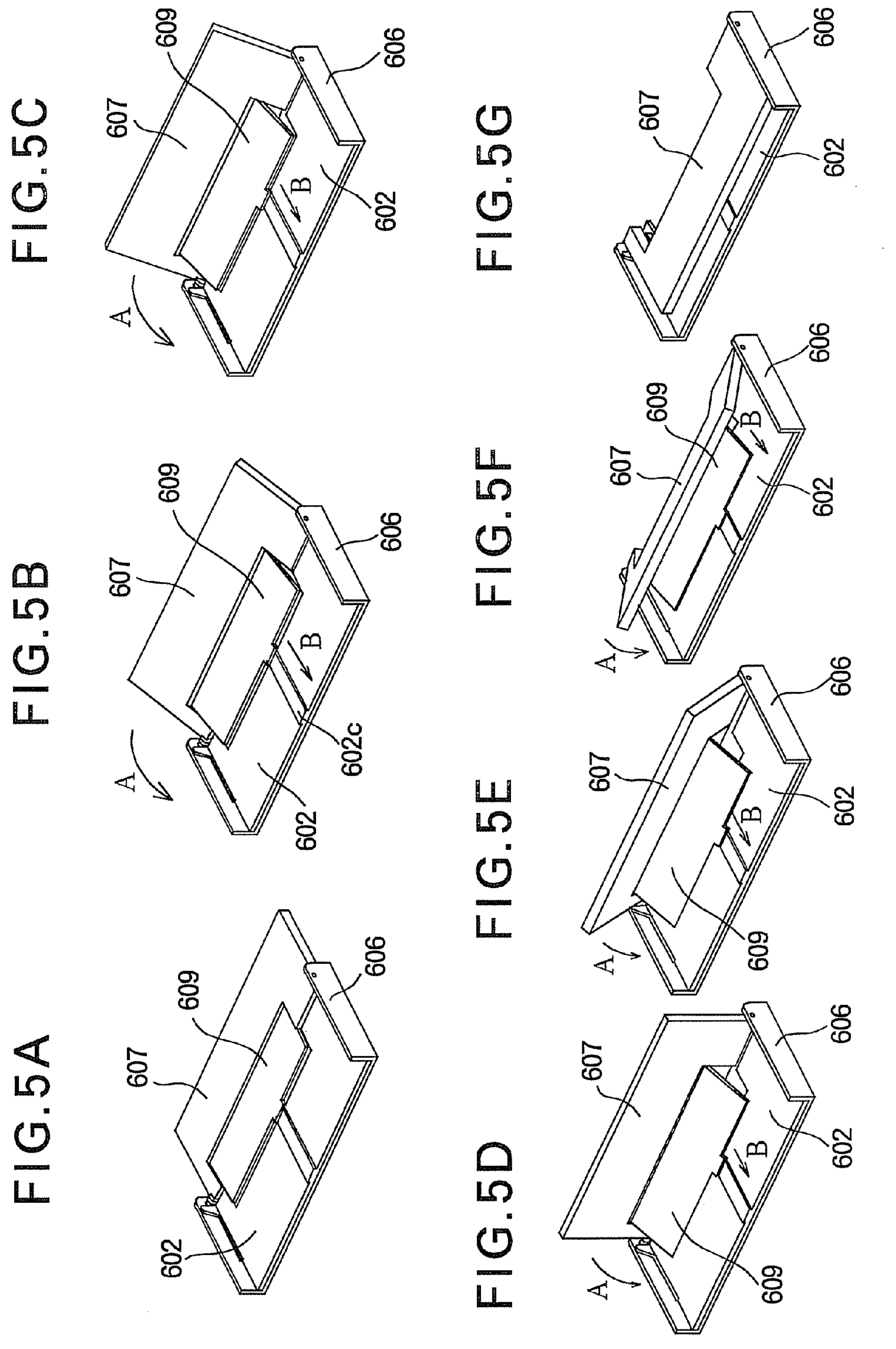
FIGS. 5A through 5G are schematic views showing an operation to move the sheet supply tray to the housed position in the main body of the medium feeding apparatus according to Embodiment 1 of the present invention in the order of the operation.

FIGS. 5A trough 5G show an operation to move the sheet supply tray 600 to the housed position in the main body in the order of the operation. In this regard, the second auxiliary trays 608 are housed in the lower portion of the first auxiliary tray 607. For ease of explanation of the operation, structures are illustrated in a simplified manner in FIGS. 5A through 5G.

FIG. 5A shows a state where the recording sheets 601 (FIG. 2) can be stacked on the sheet supply tray 600, i.e., where the first auxiliary tray 607 and the auxiliary placing plate 609 are substantially parallel to the sheet placing plate (the main tray) 602 in the reference rotational position. In this state, the first auxiliary tray 607 and the auxiliary placing plate 609 are in the fully-opening conditions as described above.

From the state shown in FIG. 5A, when, for example, the user moves the first auxiliary tray 607 upward in the direction shown by the arrow A toward the housed position, the first auxiliary tray 607 rotates about the pair of bosses 607*a* (see FIG. 3) as the rotation shaft portion as shown in FIGS. 5B through 5F. Further, the auxiliary placing plate 609 rotates about the pair of bosses 609*a* (see FIG. 3) as the rotation shaft portion supported by the first auxiliary tray 607, and slides in the direction shown by the arrow B on the sheet placing plate 602 while the auxiliary placing plate 609 is guided by the convex portion 602*c* on the sheet placing plate 602. When the first auxiliary tray 607 rotates by substantially 180 degrees as shown in FIG. 5G, the auxiliary placing plate 609 finishes the movement and is folded. In this state, the first auxiliary tray 607 and the auxiliary placing plate 609 are housed in the outer cover portion 606. Finally, as shown in FIG. 4, the outer cover portion 606 (in which the first auxiliary tray 607 and the auxiliary placing plate 609 are housed) is rotated to the main body side, and the outer cover portion 606 is locked by the locking portion 610 and housed in the main body of the medium feeding apparatus 720.

In the case of opening the sheet supply tray 600 housed in the main body of the image forming apparatus 1000, the locking of the sheet supply tray 600 by the locking portion 610 is released, and then the outer cover 606 is opened to the state shown in FIG. 5G. Further, the first auxiliary tray 607 is rotated in the direction opposite to the direction A by substantially 180 decrees, with the respective parts moving in the order as shown in FIGS. 5G, 5F, 5E, 5D, 5C, 5B and 5A, with the result that the first auxiliary tray 607 and the auxiliary placing plate 609 are in the fully-opening conditions.

As described above, according to the sheet supply tray 600 of Embodiment 1 of the present invention, the auxiliary placing plate 609 is disposed across the boundary between the sheet placing plate 602 and the first auxiliary tray 607 and prevents the formation of the linear gap extending throughout the boundary. Therefore, it becomes possible to prevent the bending, buckling and breakage of the recording sheet 615. Moreover, even when the sheet supply tray 600 has a wide opening corresponding to a wide recording sheet, it is possible to prevent a narrow recording sheet from being dropped via the opening and from being soiled, since the opening is substantially closed by the auxiliary placing plate 609. Thus, the ease of handling of the recording sheets 601 can be enhanced. Furthermore, the auxiliary placing plate 609 is rotatable in synchronization with the operation of the first auxiliary tray 607, and therefore the sheet supply tray 600 can be folded compactly.

Figure 6:
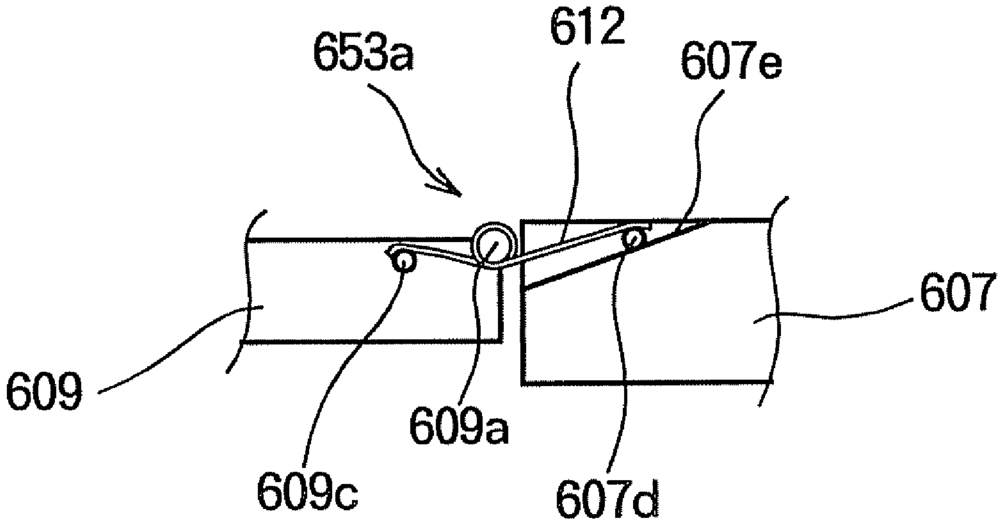
FIG. 6 is a perspective view showing a modification of a sheet supply tray according to Embodiment 1 of the present invention.

FIG. 6 is a partial view showing a modification of the sheet supply tray 600 according to Embodiment 1. FIG. 6 corresponds to a view showing a structure of one of rotation supporting portions 653*a* including the bosses 609*a* as seen from the positive side in the direction of Y-axis, with reference to FIG. 3A.

As shown in FIG. 6, an urging unit, for example, a torsion spring 612 is added to the rotation supporting portion 653*a*. The torsion spring 612 is so disposed that the boss 609*a* fits in a spiral portion of the torsion spring 612. One end of the torsion spring 612 is held on a lock pin 609*c* formed on the auxiliary placing plate 609, and the other end of the torsion spring 612 is held on a lock pin 607*d* formed on the first auxiliary tray 607. In this modification, a groove 607*e* is formed on the first auxiliary tray 607 if necessary. The torsion spring 612 is mounted in a compressed state, and continuously urges the auxiliary placing plate 609 to the sheet placing plate 602 (the main tray) side.

Accordingly, when the user moves the first auxiliary tray 607 upward in the direction shown by the arrow A toward the housed position from the state shown in FIG. 3A, causing the first auxiliary tray 607 to rotate as shown in FIGS. 5B through 5G, the auxiliary placing plate 609 slides in the direction shown by the arrow B on the sheet placing plate 602 in such a manner that the auxiliary placing plate 609 is continuously urged against the sheet placing plate 602 (the main tray) by the torsion spring 612.

As described above, the auxiliary placing plate 609 is urged against the sheet placing plate 602, and therefore the auxiliary placing plate 609 can be stably moved in synchronization with the first auxiliary tray 607. It is assumed that the auxiliary placing plate 609 (covering the boundary) may bounce depending on the handling by the user, and therefore the setting operation may become troublesome for the user. However, according to the modification, the auxiliary placing plate 609 surely covers the boundary between the sheet placing plate 602 (the main tray) and the first auxiliary tray 607 due to the force applied by the urging unit, and therefore the ease of handling the recording sheets can be further enhanced.

Embodiment 2

Figures 7A, 7B:
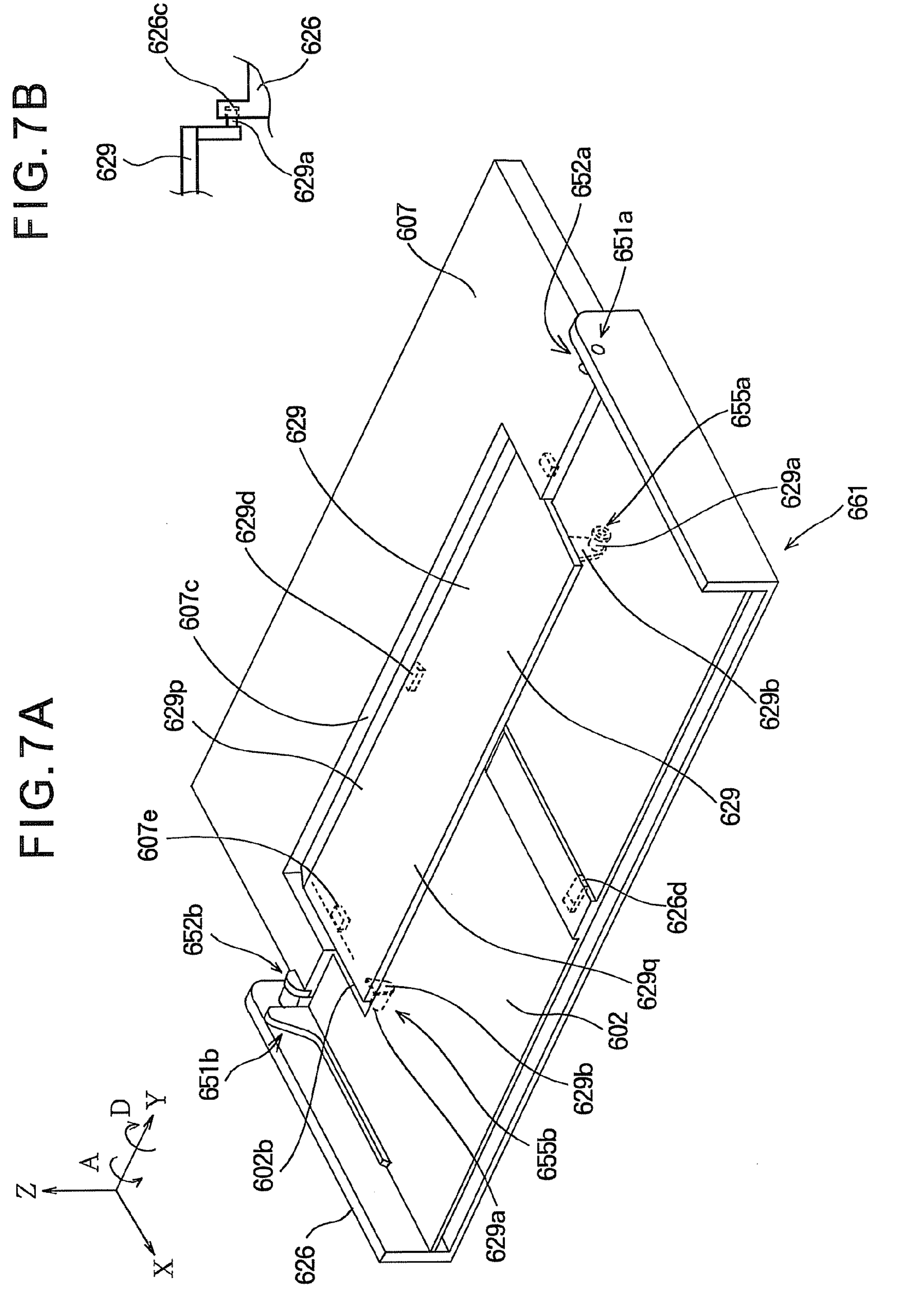
FIG. 7A is a simplified view showing a relationship among an outer cover portion, a sheet placing plate, a first auxiliary tray and an auxiliary placing plate (when assembled) according to Embodiment 2 of the present invention.
FIG. 7B is a partial view showing a structure of a rotation supporting portion of the sheet supply tray according to Embodiment 2 of the present invention.

FIG. 7A is a simplified view showing a relationship among an outer cover portion 626, the sheet placing plate 602 (the main tray), the first auxiliary tray 607 and an auxiliary placing plate 629 of a sheet supply tray when assembled according to Embodiment 2 of the present invention.

The medium feeding apparatus employing this sheet supply tray is mainly different from the medium feeding apparatus 720 (FIG. 1) according to Embodiment 1 in the mounting structure of the auxiliary placing plate 629 shown in FIG. 7A. The components of the medium feeding apparatus employing this sheet supply tray that are the same as those of the above described medium feeding apparatus 720 of Embodiment 1 are assigned the same reference numerals or omitted in drawings, and duplicate explanation will be omitted. The description will be emphasized on the difference.

In a main placing portion 661 of the sheet supply tray of Embodiment 2 shown in FIG. 7A, the structures of the rotation supporting portions 651*a* and 651*b* at which the sheet placing plate 602 is rotatably supported by the outer cover 626, and the structures of the rotation supporting portions 652*a* and 652*b* at which the first auxiliary tray 607 is rotatably supported by the outer cover portion 626 are the same as those described in Embodiment 1, and therefore duplicate explanation will be omitted.

The auxiliary placing plate 629 has an external shape so that the auxiliary placing plate 629 fits in the substantially rectangular opening (with a slight gap formed therebetween) formed of the rectangular U-shaped cutout portion 602*b* of the sheet placing plate 602 and the rectangular U-shaped cutout portion 607*c* of the first auxiliary tray 607. The auxiliary placing plate 629 has a pair of protrusions 629*b* formed in the vicinity of the longer side thereof on the side 629*q* facing the sheet placing plate 602. Bosses 629*a* are formed on the protrusions 629*b*, which are coaxial with each other and form a rotation shaft portion.

FIG. 7B is a partial view showing a structure of a rotation supporting portion 655*a* which is one of rotation supporting portions 655*a* and 655*b* including the bosses 629*a*, as seen from the positive side in the direction of the X-axis. The boss 629*a* are disposed on the side 629*q* of the auxiliary placing plate 629 facing the sheet placing plate 602. The boss 629*a* engages (and is rotatably supported by) a shaft receiving portion 626*c* formed on a corresponding position on the outer cover portion 626 as shown in FIG. 7B. The other rotation supporting portion 655*b* is configured in a similar manner to the rotation supporting portion 655*a*. With such a configuration, the auxiliary placing plate 629 is rotatably supported by the outer cover portion 626.

An engaging portion 629*d* is formed substantially at the center of the bottom surface of the auxiliary placing plate 629 and in the vicinity of the longer side of the auxiliary placing plate 629 on the side 629*p* facing the first auxiliary tray 607. An engaging portion 626*d* is formed on an outer surface 626*q* (i.e., a surface opposite to a surface 626*p* facing the sheet placing plate 602) of the outer cover portion 626. As described later, the engaging portion 626*d* engages the engaging portion 629*d* of the auxiliary placing plate 629 to fix the auxiliary placing plate 629, when the auxiliary placing plate 629 rotates about the Y-axis in the direction shown by the arrow D by substantially 180 degrees from the state shown in FIG. 7A and faces the lower surface of the outer cover portion 626.

FIG. 7A shows a state in which the recording sheets 601 (FIG. 2) can be stacked on the sheet supply tray, i.e., where the first auxiliary tray 607 and the auxiliary placing plate 629 are substantially parallel to the sheet placing plate 602 (the main tray) in the reference rotational position. The conditions of the first auxiliary tray 607 and the auxiliary placing plate 629 are hereinafter referred to as fully-opening conditions. The first auxiliary tray 607 has a regulating portion 607*e* that prevents the auxiliary placing plate 629 from rotating in the direction shown by the arrow D about the Y-axis due to the gravity from the fully-opening condition FIG. 8 is a side view showing respective heights of the sheet placing surfaces when the sheet placing plate (the main tray) 602 is in the reference rotational position and when the first auxiliary tray 607 and the auxiliary placing plate 629 are in the fully-opening conditions.

Figure 8:
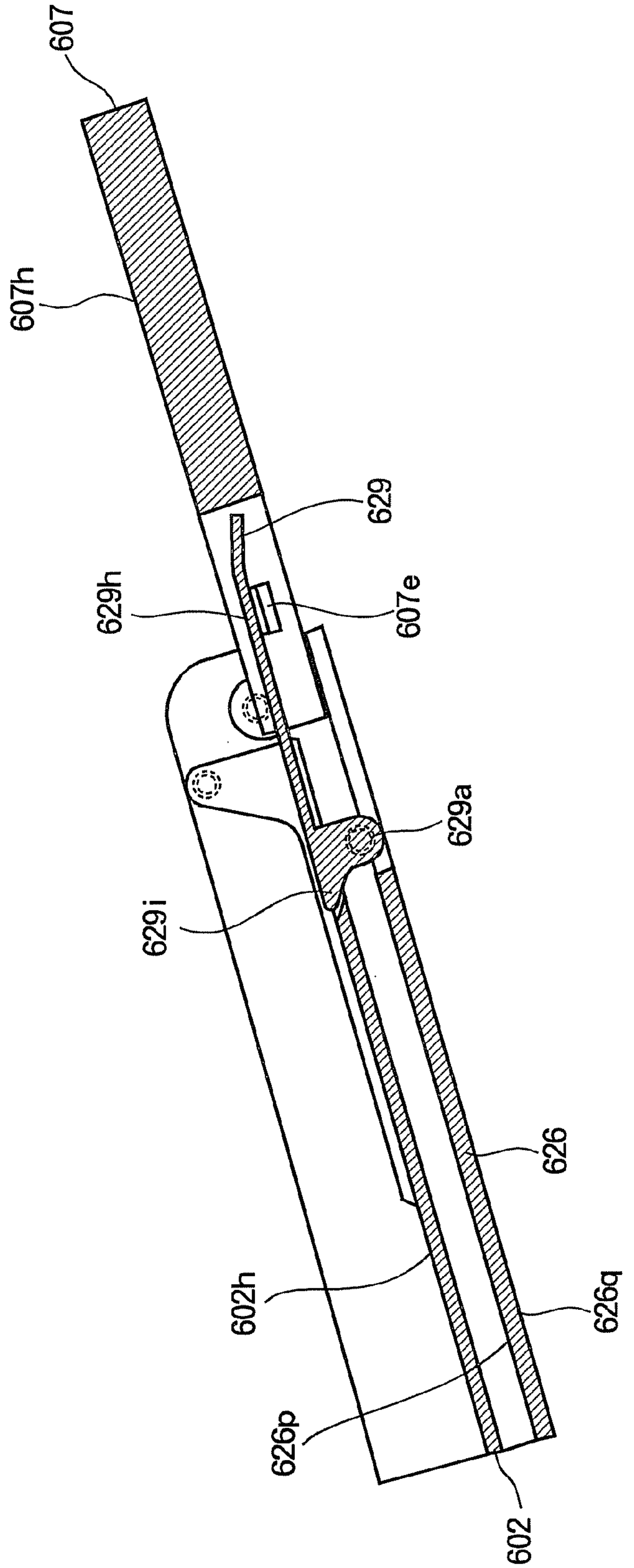
FIG. 8 is a side view showing a relationship among heights of respective placing surfaces when the sheet placing plate is in a rotational reference position and when the first auxiliary tray and the auxiliary placing plate are in fully-opening conditions.

As shown in FIG. 8, a placing surface 607*h* of the first auxiliary tray 607 is higher than a placing surface 629*h* of the auxiliary placing plate 629, the placing surface 629*h* of the auxiliary placing plate 629 is higher than a placing surface 602*h* of the sheet placing plate 602. Further, a protrusion 629*i* is formed on the auxiliary placing plate 629 so that the protrusion 629*i* overlaps with the sheet placing plate 602.

FIGS. 9A through 9E are perspective views showing an operation to move the sheet supply tray to the housed position in the main body in the order of operation. FIGS. 10A through 10E are perspective views showing the respective steps of the operation shown in FIGS. 9A through 9E, as seen from the backside of the sheet placing surface side (i.e., the outer cover portion 626 side). For ease of explanation of the operation, structures are illustrated in a simplified manner in FIGS. 9A through 10E.

Figure 9A:
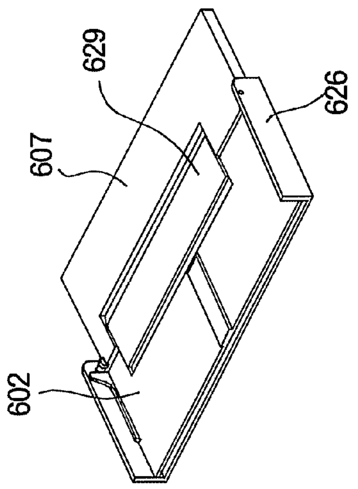
FIGS. 9A through 9E are schematic views showing an operation to move the sheet supply tray to the housed position in the main body of the medium feeding apparatus according to Embodiment 2 of the present invention in the order of the operation.

FIG. 9A shows the fully-opening condition in which the recording sheets 601 (FIG. 2) can be stacked on the sheet supply tray, i.e., in which the first auxiliary tray 607 and the auxiliary placing plate 629 are substantially parallel to the sheet placing plate 602 (the main tray) in the reference rotational position.

From the state shown in FIG. 9A, the user releases the regulation of the auxiliary placing plate 629 by the regulating portion 607*e* of the first auxiliary tray 607, and pushes the auxiliary placing plate 629 downward as shown by the arrow D. The regulating portion 607*e* of the first auxiliary tray 607 is urged by an urging unit (not shown) in the direction in which the regulating portion 607*e* protrudes to support the bottom surface of the auxiliary placing plate 629. Further, when the regulating portion 607*e* is applied with a predetermined force or more by the rotation of the auxiliary placing plate 629 in the direction shown by the arrow D, the regulating portion 607*e* is retracted and allows the auxiliary placing plate 629 to pass.

Figure 9B:
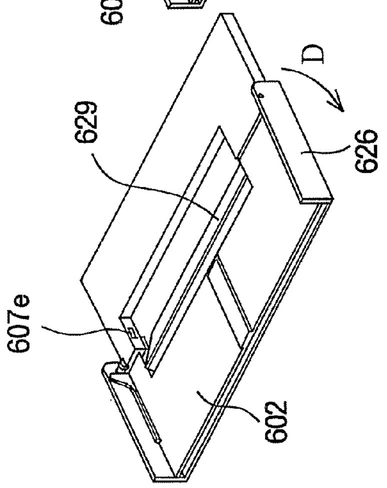
Figure 9C:
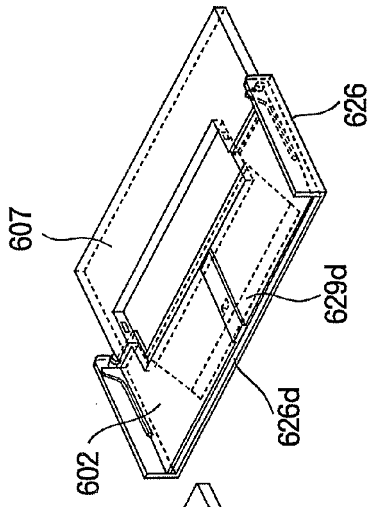
Figure 9D:
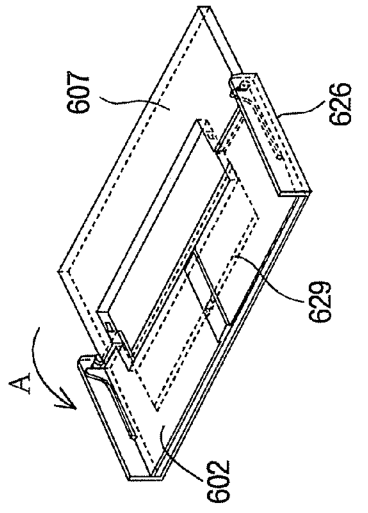
Figure 9E:
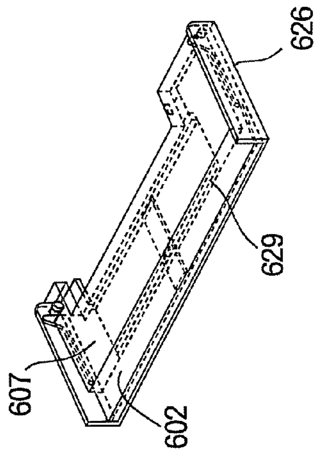
Figure 10A:
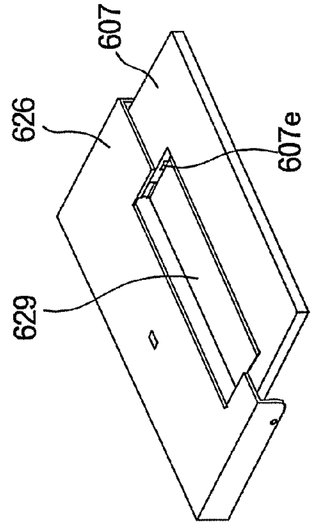
FIGS. 10A through 10E are schematic views showing the respective steps of FIGS. 9A through 9E, as seen from the backside of the sheet placing surface (i.e., as seen from the outer cover portion side)
Figure 10B:
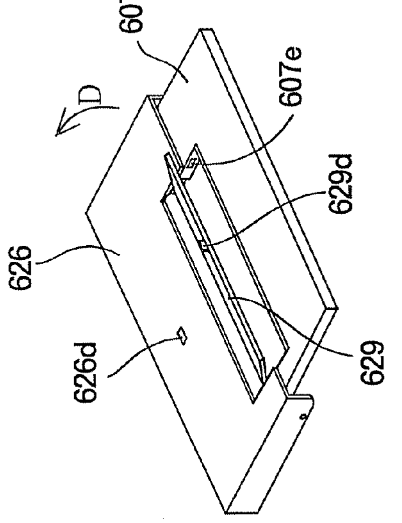
Figure 10C:
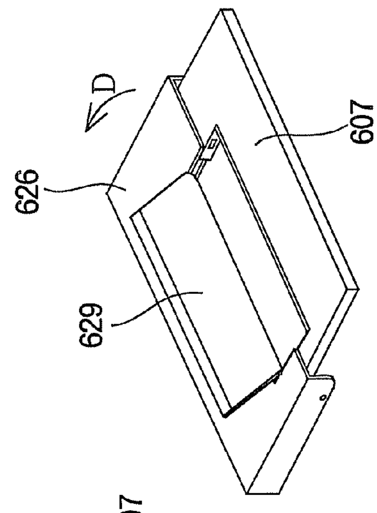
Figure 10D:
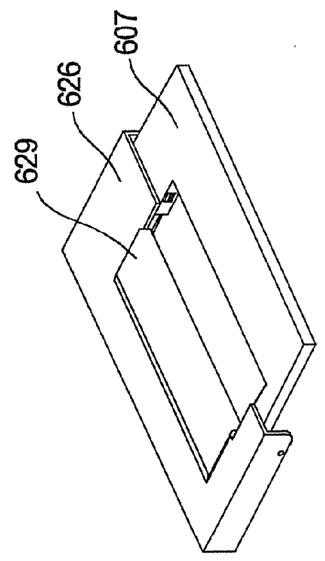
Figure 10E:
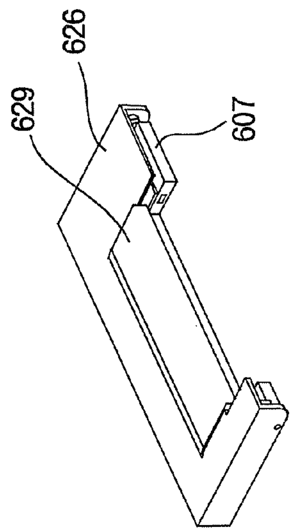

Thus, as shown in FIGS. 9B and 9C, the auxiliary placing plate 629 rotates about the pair of bosses 629*a* (FIG. 7) as the rotation shaft portion supported by the outer cover portion 626 in the direction shown by the arrow D. As shown in FIG. 9D, when the auxiliary placing plate 629 rotates by substantially 180 degrees, the engaging portion 629*d* of the auxiliary placing plate 629 engages the engaging portion 626*d* of the outer cover 626. Then, the first auxiliary tray 607 is folded in the direction shown by the arrow A as shown in FIG. 9E. Lastly, the outer cover portion 626 (corresponding to the outer cover portion 606 in FIG. 4) is rotated to the main body side, and the outer cover portion 626 is locked by the locking portion 610 and housed in the main body of the medium feeding apparatus 720.

In the case of opening the sheet supply tray housed in the main body of the image forming apparatus 1000, the locking of the outer cover portion 626 by the locking portion 610 is released, and the outer cover portion 626 is opened to the condition shown in FIG. 9E. Further, the first auxiliary tray 607 and the auxiliary placing plate 629 are rotated in the order as shown in FIGS. 9E, 9D, 9C, 9B and 9A, with the result that the first auxiliary tray 607 and the auxiliary placing plate 629 are in the fully-opening conditions.

As described above, according to the sheet supply tray of Embodiment 2, the rotation shaft portion of the auxiliary placing plate 629 is formed on the outer cover 626, and the protrusion 629*i* formed on the auxiliary placing plate 629 overlaps with the sheet feeding plate 602. Accordingly, it becomes possible to cover the boundary between the sheet placing plate 602 (the main tray) and the first auxiliary tray 607 more closely. As a result, it becomes possible to prevent the bending, buckling and breakage of the recording sheets, and to enhance the ease of handling the recording sheets.

Embodiment 3

Figures 11A, 11B:
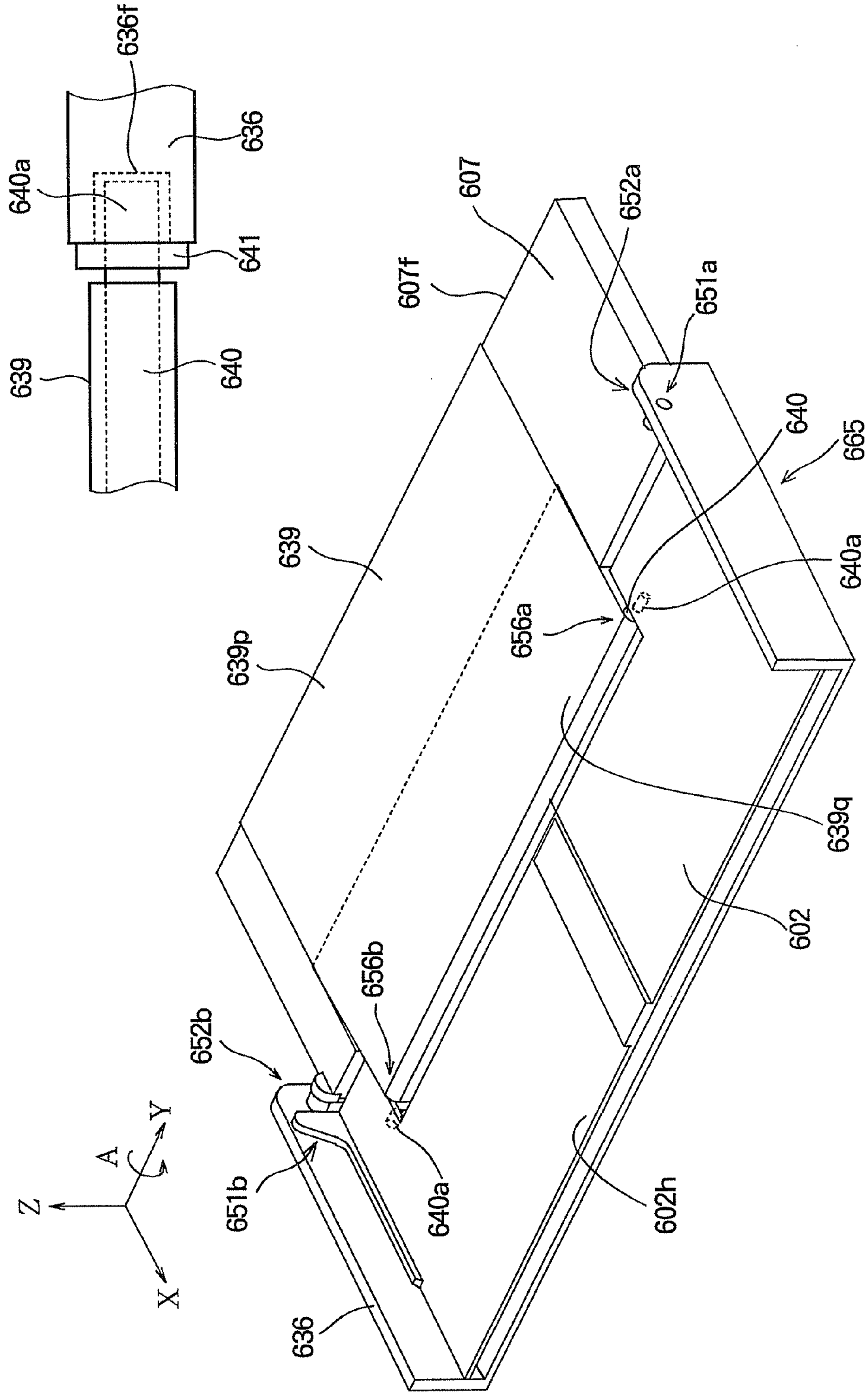
FIG. 11A is a simplified view showing a relationship among an outer cover portion, a sheet placing plate, a first auxiliary tray and an auxiliary placing plate (when assembled) according to Embodiment 3 of the present invention.
FIG. 11B is a partial view showing a structure of a rotation supporting portion of a sheet supply tray according to Embodiment 3 of the present invention.

FIG. 11A is a simplified view showing a relationship among an outer cover 636, the sheet placing plate (the main tray) 602, the first auxiliary tray 607 and an auxiliary placing sheet 639 of a sheet supply tray when assembled according to Embodiment 3 of the present invention.

The medium feeding apparatus employing this sheet supply tray is mainly different from the medium feeding apparatus 720 according to Embodiment 1 in that the auxiliary placing sheet 639 shown in FIG. 11A is used in stead of the auxiliary placing plate 609 (FIG. 3). The components of the medium feeding apparatus employing this sheet supply tray that are the same as those of the medium feeding apparatus 720 according to Embodiment 1 are assigned the same reference numerals or omitted in drawings, and duplicate explanation will be omitted. The description will be emphasized on the difference.

In a main placing portion 665 of the sheet supply tray shown in FIG. 11A, the structures of the rotation supporting portions 651*a* and 651*b* at which the sheet placing plate 602 is rotatably supported by the outer cover 636, and the structures of the rotation supporting portions 652*a* and 652*b* at which the first auxiliary tray 607 is rotatably supported by the outer cover portion 636 are the same as those described in Embodiment 1, and therefore duplicate explanation will be omitted.

The auxiliary placing sheet 639 is wound a plurality of times around a winding shaft 640 in such a manner that one end 639*q* of the auxiliary placing sheet 639 is fixed to the winding shaft 640, and the other end 639*p* of the auxiliary placing sheet 639 is fixed to an end surface 607*f* of the first auxiliary tray 607. Bosses 640*a* are formed on the winding shaft 640.

FIG. 11B is a partial view showing a structure of a rotation supporting portion 656*a* which is one of rotation supporting portions 656*a* and 656*b* including the bosses 640*a* and provided corresponding to the rearmost portion of a cutout portion 636*b* of the sheet placing plate 602, as seen from the positive side in the direction of the X-axis. As shown in FIG. 11B, the boss 640*a* engages (and is rotatably supported by) a shaft receiving portion 636*f* formed on a corresponding position of the outer cover 636. A not shown urging member, for example, a spiral spring (i.e., a winding unit 641) is provided between the shaft receiving portion 636*f* and the winding shaft 640 (i.e., the winding portion), and generates an urging force applied to the winding shaft 640 in the direction shown by the arrow A about the Y-axis. The other rotation supporting portion 656*b* is configured in a similar manner to the rotation supporting portion 656*a*. With such a structure, the winding shaft 640 is urged in the direction in which the auxiliary placing sheet 639 is wound up, so that the auxiliary placing sheet 639 is kept to be continuously tensioned.

Figure 12:
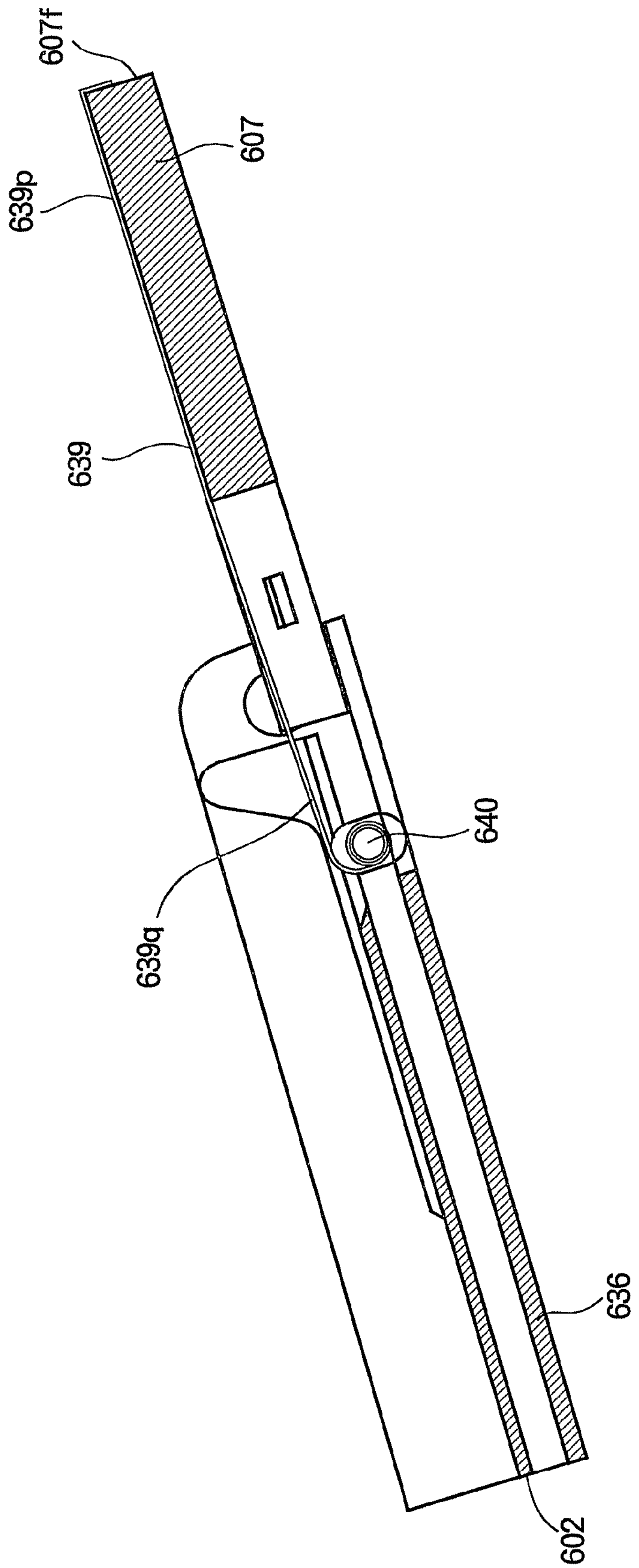
FIG. 12 is a side view showing respective parts when the sheet placing plate is in a reference rotational position and when the first auxiliary tray and the auxiliary placing plate are in fully-opening conditions.

FIG. 12 is a side view of respective parts when the sheet placing plate 602 (the main tray) is in the reference rotational position and when the first auxiliary tray 607 is in the fully-opening position. As described above, the end of the auxiliary placing sheet 639 is fixed to the end surface 607*f* of the first auxiliary tray 607. The auxiliary placing sheet 639 is composed of a film having a smoothness, and is wound around the winding shaft 640 rotatably supported by the shaft receiving portions 636*f* formed on the outer cover 636.

FIG. 13A through 13D are perspective views showing an operation to move the sheet supply tray to the housed position in the main body in the order of operation. For ease of explanation of the operation, structures are illustrated in a simplified manner in FIGS. 13A through 13D.

Figure 13A:
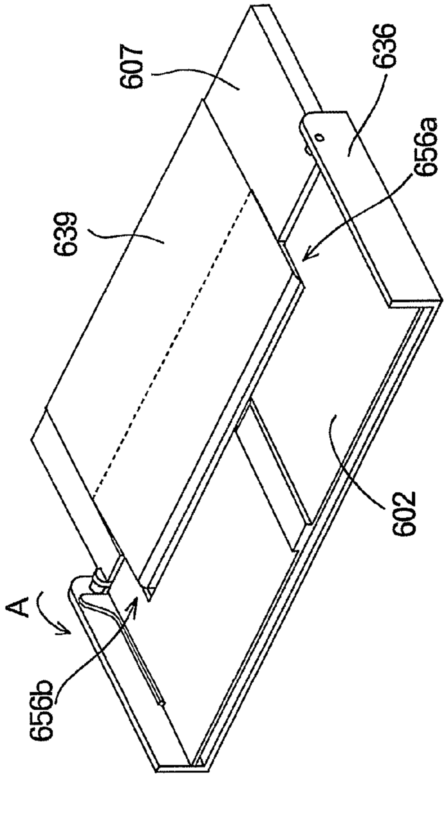
FIGS. 13A through 13D are schematic views showing an operation to move the sheet supply tray to the housed position in the main body of the medium feeding apparatus according to Embodiment 3 of the present invention in the order of the operation.
Figure 13B:
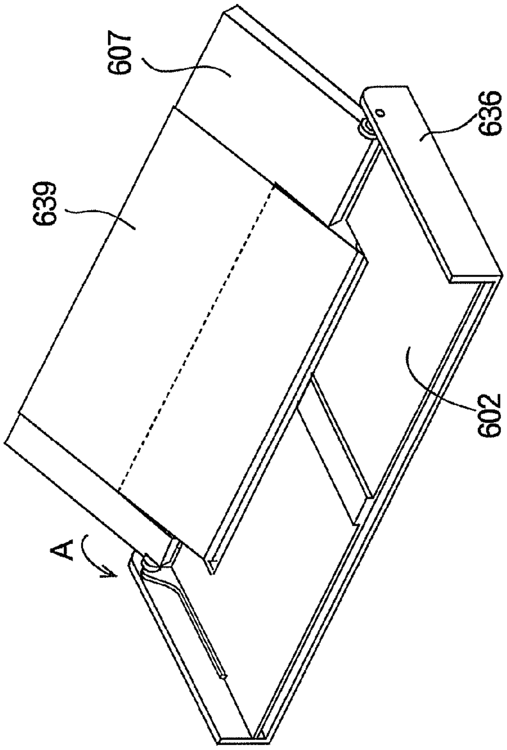
Figure 13C:
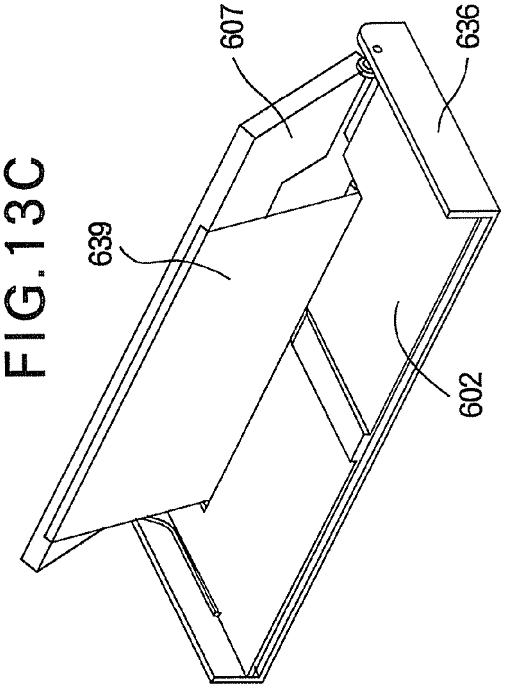
Figure 13D:
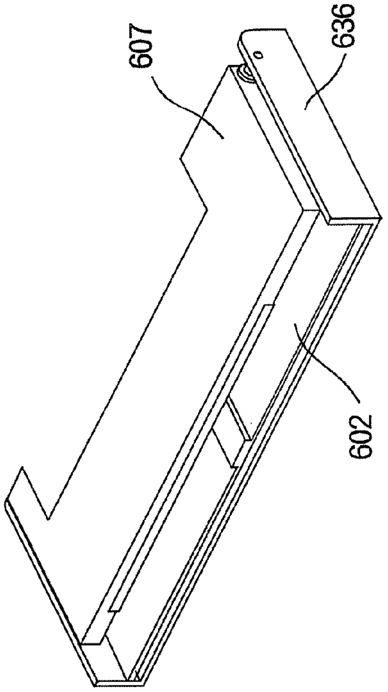

FIG. 13A shows a state where the recording sheets 601 (FIG. 2) can be stacked on the sheet supply tray, i.e., the fully-opening condition where the first auxiliary tray 607 is parallel to the sheet placing plate 602 (the main tray) in the reference rotational position. From this state, when, for example, the user moves the first auxiliary tray 607 upward in the direction shown by the arrow A toward the housed position, the auxiliary tray 607 rotates about the bosses 607*a* (FIG. 3) as the rotation shaft portion as shown in FIGS. 13B and 13C. During the rotation of the first auxiliary tray 607, the auxiliary placing sheet 639 is wound up by the winding shaft 640 while the auxiliary placing sheet 639 is kept tensioned. When the first auxiliary tray 607 rotates by substantially 180 degrees as shown in FIG. 13D, the auxiliary placing sheet 639 is housed in the outer cover portion 636 while the auxiliary placing sheet 639 is kept tensioned. Lastly, as shown in FIG. 4, the outer cover portion 636 (corresponding to the outer cover portion 606 in FIG. 4) is rotated to the main body side, and the outer cover portion 636 is locked by the locking portion 610 and housed in the main body of the medium feeding apparatus 720.

In the case of opening the sheet supply tray housed in the main body of the image forming apparatus 1000, the locking of the outer cover portion 636 by the locking portion 610 is released, and the outer cover portion 636 is opened to the state shown in FIG. 13D. Further, the first auxiliary tray 607 is rotated in the order as shown in FIGS. 13D, 13C, 13B and 13A, with the result that the first auxiliary tray 607 is in the fully-opening condition. During the rotation of the first auxiliary tray 607, the auxiliary placing sheet 639 is pulled out from the winding shaft 640 while the auxiliary placing sheet 639 is kept tensioned, and reaches the state shown in FIG. 13A.

As described above, according to the sheet supply tray of Embodiment 3, the auxiliary placing sheet 639 is used instead of the auxiliary placing plate, and therefore it becomes possible to completely eliminate the gap and step having been formed at, for example, the boundary between the first auxiliary tray 607 and the auxiliary placing plate 609 of Embodiment 1. Since the gap and the portion that may catch the recording sheet are eliminated, it becomes possible to prevent the bending, buckling and breakage of the recording sheets, and to enhance the ease of handling the recording sheets.

Embodiment 4

Figure 14A:
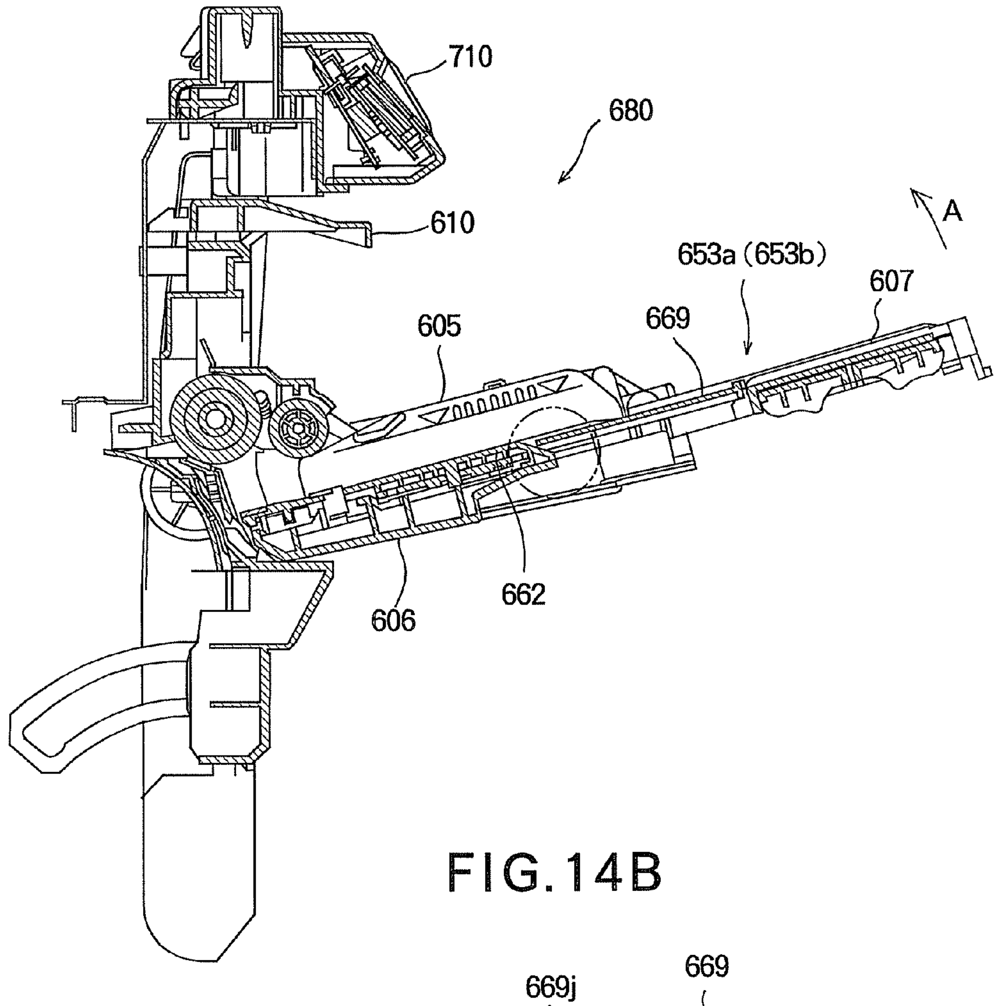
FIG. 14A is a sectional view showing a structure of a sheet supply tray according to Embodiment 4 of the present invention.
Figure 14B:
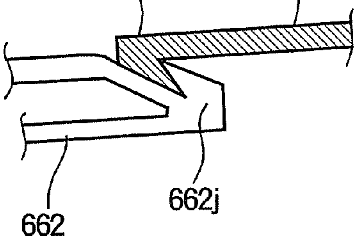
FIG. 14B is a partial view of a part indicated by a dashed two-dotted line in FIG. 14A showing a structure of a sheet supply tray according to Embodiment 4 of the present invention.

FIG. 14A is a sectional view showing a structure of a sheet supply tray according to Embodiment 4 of the present invention. FIG. 14B is a partial view of a part of the sheet supply tray encircled by a dashed two-dotted line in FIG. 14A. The sheet supply tray 680 is different from the above described sheet supply tray 600 of the Embodiment 1 in the shape of a portion where a sheet placing plate 662 (corresponding to the sheet feeding plate 602 in Embodiment 1) and an auxiliary placing plate 669 (corresponding to the auxiliary placing plate 609 in Embodiment 1) face each other. Therefore, components of the medium feeding apparatus employing the sheet supply tray 680 that are the same as those of the media feeding apparatus 720 of Embodiment 1 are assigned the same reference numerals or omitted in drawings, and duplicate explanation will be omitted. The description will be emphasized on the difference.

Hereinafter, structures for mounting the outer cover portion 606, the sheet placing plate 602 (i.e., the sheet placing plate 662 of Embodiment 4), the first auxiliary tray 607, and the auxiliary placing plate 609 (i.e., the auxiliary placing plate 669 of Embodiment 4) will be described with reference to FIG. 3A.

In a plurality of portions where the sheet placing plate 602 (662 in Embodiment 4) and the auxiliary placing plate 609 (669 in Embodiment 4) face each other as shown in FIG. 3A, claws 669*j* are formed on the sheet auxiliary plate 669 and claws 662*j* are formed on the sheet placing plate 662 as shown in FIG. 14B.

As shown in FIG. 14B, in a state where the recording sheets 601 (FIG. 2) can be stacked on the sheet supply tray 680, i.e., in a state where the sheet placing plate 662 is in the reference rotational position and the first auxiliary tray 607 and the auxiliary placing plate 669 are in the fully-opening conditions corresponding to FIG. 5A, the claw portions 669*j* and the claw portions 662*j* engage each other so that the sheet placing plate 662 and the auxiliary placing plate 669 surely engage each other.

Figure 15A:
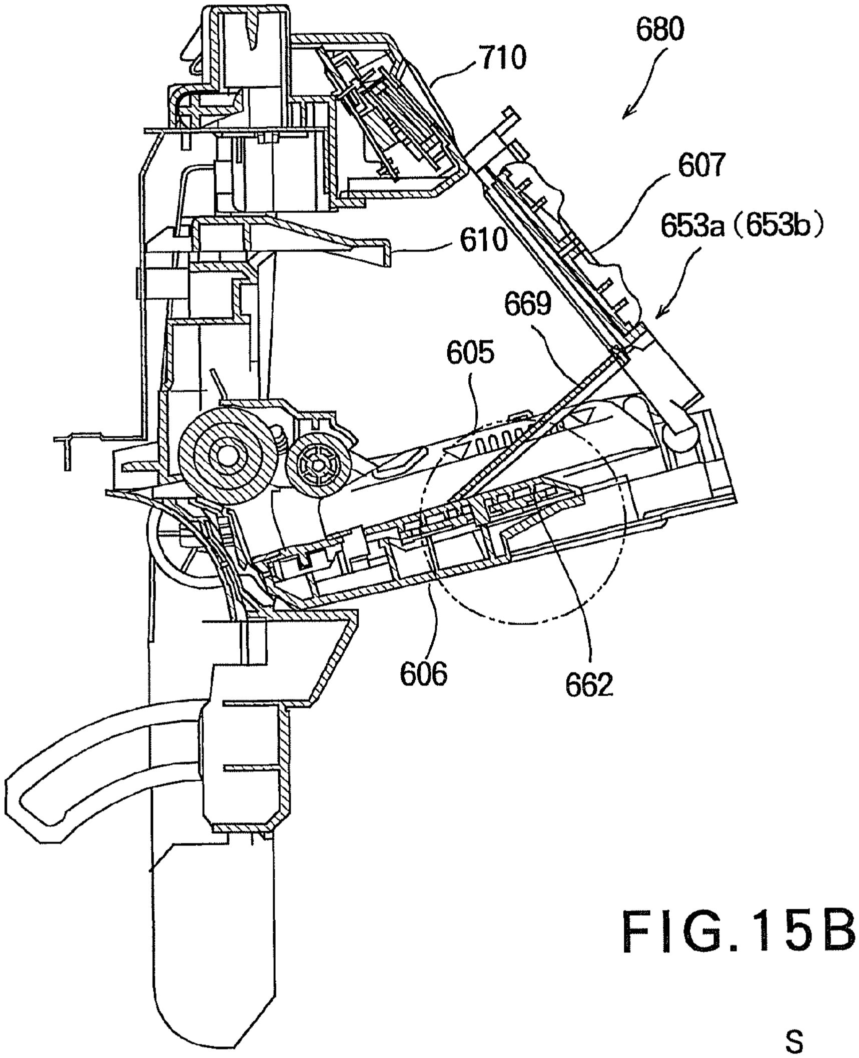
FIG. 15A is a sectional view showing the sheet supply tray according to Embodiment 4 of the present invention in a state where the first auxiliary tray is lifted in a direction shown by the arrow A in FIG. 14A by an angle of 90 degrees or more.
Figure 15B:
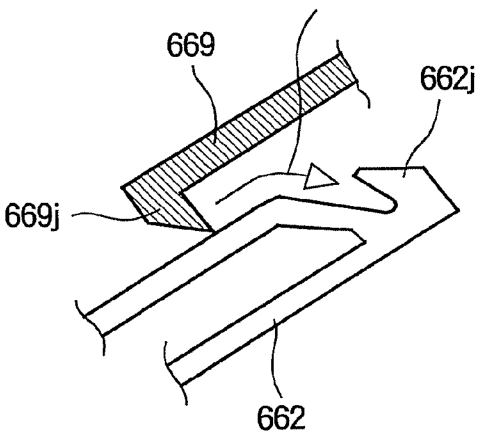
FIG. 15B is a partial view of a part indicated by a dashed two-dotted line in FIG. 15A showing a structure of a sheet supply tray according to Embodiment 4 of the present invention.

FIG. 15A shows a state where, for example, the user moves the first auxiliary tray 607 upward in the direction shown by the arrow A toward the housed position and the first auxiliary tray 607 rotates by 90 degrees or more (corresponding to FIG. 5E). FIG. 15B is a partial view of a part of the sheet supply tray encircled by a dashed two-dotted line in FIG. 15A. In FIG. 15B, the claw portions 669*j* and the claw portions 662*j* are separate from each other. From this state, when the first auxiliary tray 607 is rotated in the direction opposite to the direction shown by the arrow A in order to bring the first auxiliary tray 607 and the auxiliary placing plate 669 to the fully-opening conditions, the claw portions 669*j* of the auxiliary placing plate 669 move as shown by the arrow S in FIG. 15B along the slope of the sheet placing plate 662, and the claw portions 669*j* and the claw portions 662*j* again engage each other, so that the sheet placing plate 662 and the auxiliary placing plate 669 surely engage each other.

As described above, according the sheet supply tray of Embodiment 4, the claw portions 662*j* formed on the sheet placing plate 662 engage the claw portions 669*j* formed on the sheet placing plate 669, and therefore the sheet placing plate 662 and the auxiliary placing plate 669 are combined with each other and function as a reinforcing plate. Accordingly, the rigidity of the sheet supply tray is enhanced, and it becomes possible to prevent the warping of the sheet supply tray. As a result, the generation of a gap that may otherwise be caused by the warping of the sheet supply tray can be prevented. Therefore, it becomes possible to prevent the bending, buckling and breakage of the recording sheets, and to enhance the ease of handling the recording sheets.

Embodiment 5

Figures 16A, 16B:
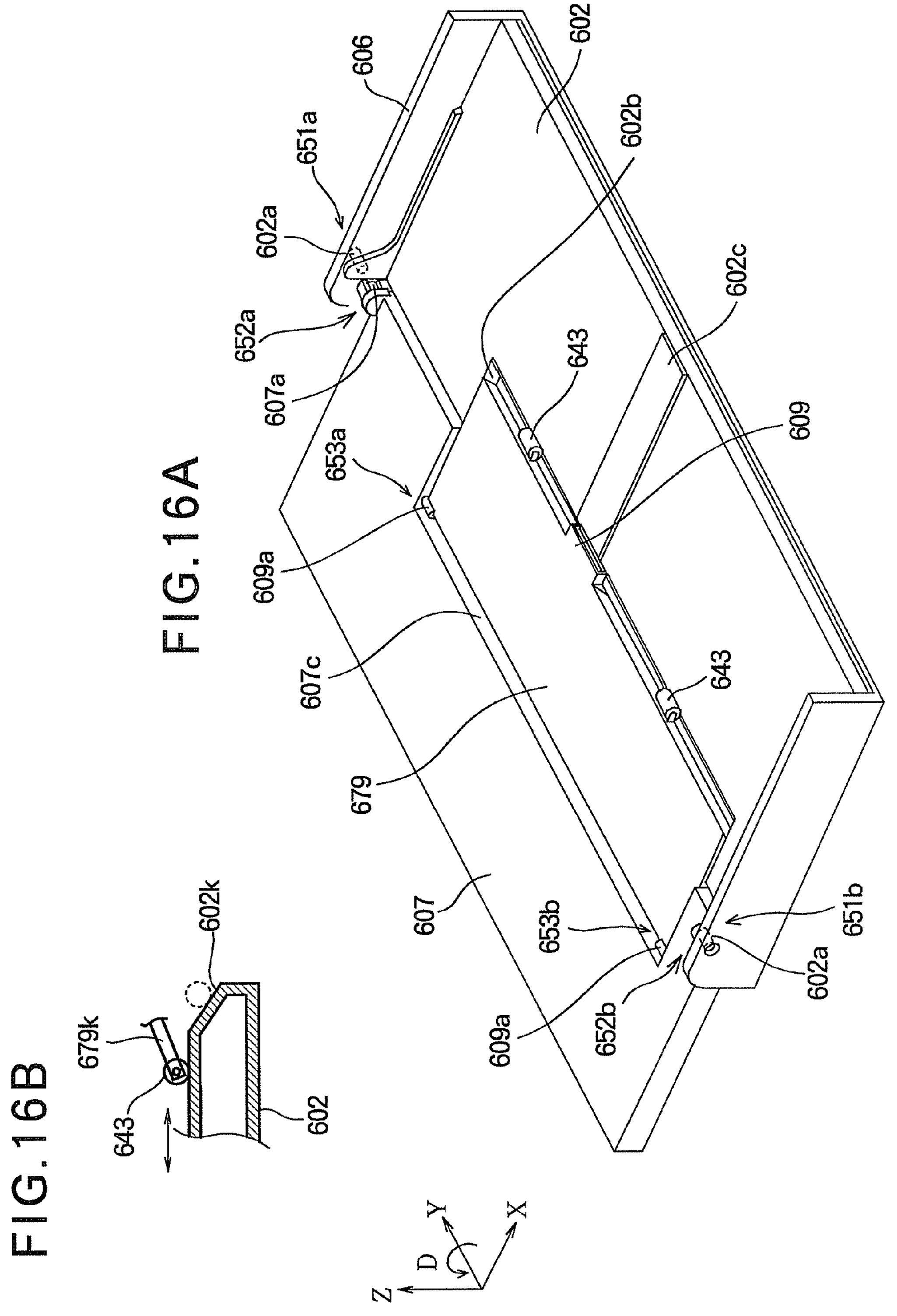
FIG. 16A is a simplified view showing a relationship among an outer cover portion, a sheet placing plate, a first auxiliary tray and an auxiliary placing plate (when assembled) according to Embodiment 5 of the present invention.
FIG. 16B is a partial view showing a part of the sheet supply tray in which a roller is provided.

FIG. 16A is a simplified view showing a relationship among the outer cover portion 606, the sheet placing plate (the main tray) 602, the first auxiliary tray 607 and a auxiliary placing plate 679 (when assembled) of a sheet supply tray according to Embodiment 5 of the present invention.

The medium feeding apparatus employing this sheet supply tray is mainly different from the medium feeding apparatus 720 according to Embodiment 1 in that rollers 643 are provided on a plurality of portions (for example, two portions) of an auxiliary placing plate 679 as shown in FIG. 16A. The components of the medium feeding apparatus employing this sheet supply tray that are the same as those of the medium feeding apparatus 720 according to Embodiment 1 are assigned the same reference numerals or omitted in drawings, and duplicate explanation will be omitted. The description will be emphasized on the difference.

FIG. 16B is a view showing a part of the sheet supply tray in which one of rollers 643 is provided, as seen from the positive side in the direction of the Y-axis. Each roller 643 is rotatably supported by two arms 679*k* extending from the auxiliary placing plate 679 so as to sandwich the roller 643 therebetween. In a state where the recording sheets 601 (FIG. 2) can be stacked on the sheet supply tray, i.e., in a state where the sheet placing plate 602 is in the reference rotational position and the first auxiliary tray 607 and the auxiliary placing plate 679 are in the fully-opening conditions (corresponding to FIG. 5A), the rollers 643 remain on the positions on a slope 602*k* formed on the sheet placing plate 602 as shown by a dashed line in FIG. 16B. In this state, it is more preferable that the rollers 643 do not contact the slope 602*k* of the sheet placing plate 602.

From this state, when the first auxiliary tray 607 is rotated through the rotational positions shown in FIGS. 5A through 5G and the auxiliary placing plate 609 (i.e., the auxiliary placing plate 679 in Embodiment 5) slides on the sheet placing plate 602, the rollers 643 smoothly move on the sheet placing plate 602 including the slope 602*k*.

As described above, according to the sheet supply tray of Embodiment 5, a plurality of rollers 643 are rotatably provided on the end of the auxiliary placing plate 679 covering the boundary, and therefore the auxiliary placing plate 679 smoothly moves in synchronization with the first auxiliary tray 607. Therefore, the ease of handling the sheet supply tray is enhanced. Moreover, during the setting of the recording sheets by the user (in a state where the auxiliary placing plate 679 is in a position where the recording sheets can be stacked), when the backside of the lowermost recording sheet contacts the rollers 643, the rollers 643 are able to rotate in contact with the recording sheet. Therefore, the friction force can be reduced. As a result, it becomes possible to prevent the bending, buckling and breakage of the recording sheets, and to enhance the ease of handling the recording sheets.

In the above described embodiments, the medium feeding apparatus of the present invention has been explained as a sheet supplying apparatus used in an electrophotographic color printer (i.e., an image forming apparatus). However, the medium feeding apparatus of the present invention can also be applied to a sheet supply apparatus used in an image forming apparatus such as a copier, a facsimile, a printer or the like that forms an image on a medium. Moreover, the medium feeding apparatus of the present invention can also be applied to a sheet ejection tray used in the image forming apparatus. Furthermore, the medium feeding apparatus of the present invention can also be applied to a sheet supply apparatus or a sheet ejection tray used in a scanner that reads information of the medium.

While the preferred embodiments of the present invention have been illustrated in detail, it should be apparent that modifications and improvements may be made to the invention without departing from the spirit and scope of the invention as described in the following claims.

What is claimed is:

1. A medium feeding apparatus, comprising:

a main body, and a medium placing unit at least a part of which is houseable in said main body, wherein said medium placing unit includes:

a first placing unit having a first placing surface, and being held by said main body in such a manner that said first placing unit is shiftable between a housed position where at least a part of said first placing unit is housed in said main body, and a medium placing position where a medium is placeable on said first placing unit surface;

a second placing unit having a second placing surface, and having a first shifting condition where said medium is simultaneously placeable on said first and second placing surfaces and a second shifting condition where said second placing surface is overlapped with said first placing surface, and an auxiliary member having an auxiliary placing surface, and being disposed on a boundary between said first placing surface and said second placing surface so that said medium is simultaneously placeable on said first placing surface, said second placing surface and said auxiliary placing surface when said second placing unit is in said first shifting condition.

2. The medium feeding apparatus according to claim 1, wherein said first placing unit includes:

a holding member movable between said housed position and said medium placing position, and a medium placing portion shiftably held by said holding member and having a said first placing surface, wherein, when said holding member is in said medium placing position, said first placing surface is adjacent to said main body.

3. The medium feeding apparatus according to claim 1, wherein a first end portion of said auxiliary member is rotatably held by said second placing unit, and a second end portion of said auxiliary member moves on said first placing surface in accordance with a shifting of said second placing unit.

4. The medium feeding apparatus according to claim 1, wherein said first placing unit and said auxiliary member have engaging portions that engage each other when said second placing unit is in said first shifting condition.

5. The medium feeding apparatus according to claim 3, further comprising an urging member that urges said second end portion of said auxiliary member against said first placing surface.

6. The medium feeding apparatus according to claim 3, further comprising a rotating member provided on said second end portion of said auxiliary member, said rotating member rotating on said first placing surface.

7. The medium feeding apparatus according to claim 1, wherein said auxiliary member is shiftably held by said first placing unit.

8. The medium feeding apparatus according to claim 2, wherein said auxiliary member is shiftably held by said holding member.

9. The medium feeding apparatus according to claim 8, wherein said auxiliary member is shiftable between a housed position in which said auxiliary member faces a surface of said holding member opposite to a surface thereof facing said medium placing portion and a medium placing position in which said auxiliary member is disposed on a boundary of said medium placing portion and said second placing unit.

10. The medium feeding apparatus according to claim 1, wherein said auxiliary member includes a sheet member, wherein a first end of said sheet member is fixed to said second placing unit, and a second end of said sheet member is wound around a winding portion rotatably held on said first placing unit and applied with a rotational force in one direction so that said sheet member is kept tensioned.

11. An image forming apparatus including said medium feeding apparatus according to claim 1.

12. The medium feeding apparatus according to claim 1, wherein said auxiliary placing surface and said first placing surface form a substantially continuous surface when said second placing unit is in said first shifting condition.

13. The medium feeding apparatus according to claim 1, wherein said auxiliary placing surface, said first placing surface and said second placing surface form a substantially continuous surface when said second placing unit is in said first shifting condition.

14. The medium feeding apparatus according to claim 4, wherein said engaging portions are claw portions.

* * * * *